US012732367B2

(12) United States Patent
Higgins et al.

(10) Patent No.: US 12,732,367 B2
(45) Date of Patent: Sep. 8, 2026

(54) AUTHENTICATING DATA ACROSS DISTINCT REMOTE GAME SERVERS IN A GAME STREAMING ENVIRONMENT

(71) Applicant: IGT, Las Vegas, NV (US)

(72) Inventors: Kevin Higgins, Reno, NV (US); Dwayne R. Nelson, Las Vegas, NV (US); Jeffrey de Anda, San Francisco, CA (US)

(73) Assignee: IGT, Las Vegas, NV (US)

( * ) Notice: Subject to any disclaimer, the term of this patent is extended or adjusted under 35 U.S.C. 154(b) by 66 days.

(21) Appl. No.: 18/887,570

(22) Filed: Sep. 17, 2024

(65) Prior Publication Data

US 2026/0081779 A1 Mar. 19, 2026

(51) Int. Cl.

| | |
|---|---|
| ***H04L 9/32*** | (2006.01) |
| ***A63F 13/35*** | (2014.01) |
| ***G06F 15/16*** | (2006.01) |
| ***G07F 17/32*** | (2006.01) |
| ***H04L 15/16*** | (2006.01) |

(52) U.S. Cl.

CPC ............ *H04L 9/3213* (2013.01); *A63F 13/35* (2014.09); *H04L 9/3247* (2013.01)

(58) Field of Classification Search

CPC ....... H04L 9/3213; H04L 9/3247; A63F 13/35

USPC .............................................................. 726/9

See application file for complete search history.

(56) References Cited

U.S. PATENT DOCUMENTS

| | | | |
|---|---|---|---|
| 7,156,741 | B2 | 1/2007 | Hornik et al. |
| 7,980,948 | B2 | 7/2011 | Rowe et al. |
| 8,262,468 | B1 | 9/2012 | Vanbragt et al. |
| 8,308,557 | B2 | 11/2012 | Bryson et al. |
| 8,308,574 | B2 | 11/2012 | Burke et al. |
| 8,578,338 | B2 | 11/2013 | Nguyen |
| 8,579,702 | B2 | 11/2013 | Oatman et al. |
| 8,690,684 | B2 | 4/2014 | Vanbragt et al. |
| 8,727,892 | B1 | 5/2014 | Chun |
| 9,005,011 | B2 | 4/2015 | Gagner et al. |
| 9,401,065 | B2 | 7/2016 | Lemay et al. |
| 9,466,173 | B2 | 10/2016 | Nelson et al. |
| 9,597,586 | B1 | 3/2017 | Wiklem et al. |
| 9,604,132 | B1 | 3/2017 | Wiklem et al. |
| 9,715,789 | B1 | 7/2017 | Kane et al. |
| 9,761,081 | B2 | 9/2017 | Barclay et al. |
| 10,105,596 | B1 | 10/2018 | Mann |
| 10,515,510 | B2 | 12/2019 | Arnone et al. |
| 10,937,271 | B2 | 3/2021 | Malek |
| 10,950,081 | B2 | 3/2021 | Baker et al. |
| 10,984,633 | B2 | 4/2021 | Malek |
| 11,080,967 | B2 | 8/2021 | Higgins et al. |
| 11,087,584 | B2 | 8/2021 | Nelson et al. |
| 11,145,168 | B2 | 10/2021 | Filipour et al. |

(Continued)

*Primary Examiner* — Berhanu Shitayewoldetsadik

(74) *Attorney, Agent, or Firm* — Neal, Gerber & Eisenberg LLP

(57) ABSTRACT

Systems and methods that determine whether data determined by a first remote game server in association with a play of a wagering game displayed by a streaming device is authentic data. If so, the systems and methods cause a communication of the authentic data to a second remote game server operating with a client device. On the other hand, if the data is not authentic, the systems and methods store the data as unauthentic data without communicating any data to the second remote game server operating with the client device.

20 Claims, 20 Drawing Sheets

(56) References Cited

U.S. PATENT DOCUMENTS 11,288,918 B2 3/2022 Miltenberger et al.
11,302,150 B2 4/2022 Nelson et al.
2002/0094869 A1 7/2002 Harkham
2003/0032407 A1 2/2003 Mages
2003/0100375 A1 5/2003 Wakae et al.
2004/0259633 A1* 12/2004 Gentles .................. G07F 17/32 463/29
2006/0154721 A1 7/2006 Okuniewicz
2008/0058049 A1 3/2008 Lutnick et al.
2008/0146344 A1 6/2008 Rowe et al.
2008/0274798 A1 11/2008 Walker et al.
2008/0318669 A1 12/2008 Buchholz
2009/0221365 A1 9/2009 Levy
2009/0325686 A1 12/2009 Davis et al.
2012/0094737 A1 4/2012 Barclay et al.
2013/0274001 A1* 10/2013 de Jesus ................ A63F 13/87 463/25
2013/0281188 A1 10/2013 Guinn et al.
2014/0004953 A1* 1/2014 Rama Rao ............. A63F 13/48 463/42
2014/0024446 A1* 1/2014 Bigelow, Jr. ........ G07F 17/3241 463/29
2014/0038141 A1 2/2014 Burza et al.
2014/0274359 A1 9/2014 Helava et al.
2014/0370970 A1 12/2014 Adiraju et al.
2015/0072786 A1 3/2015 Perry et al.
2015/0087414 A1 3/2015 Chen et al.
2015/0335999 A1 11/2015 Shimizu et al.
2016/0166939 A9 6/2016 Chudley et al.
2017/0006322 A1 1/2017 Dury et al.
2017/0358176 A1 12/2017 Carpenter et al.
2018/0089961 A1 3/2018 Filipour et al.
2019/0132115 A1* 5/2019 Kodalapura .......... G06F 21/564
2019/0147703 A1 5/2019 Malek
2019/0304249 A1 10/2019 Malek
2020/0043293 A1 2/2020 Nelson et al.
2020/0066093 A1 2/2020 Schwartz
2020/0184776 A1 6/2020 Higgins et al.
2020/0265685 A1 8/2020 Nelson et al.
2020/0302734 A1* 9/2020 Baker ................. G07F 17/3244
2020/0342717 A1 10/2020 Nelson
2021/0075592 A1* 3/2021 Zhuo .................. G06F 11/1076
2021/0201622 A1 7/2021 Baker et al.
2021/0233364 A1 7/2021 Jarvis et al.
2021/0241583 A1 8/2021 Malek
2021/0286669 A1* 9/2021 Lu ....................... G06F 11/1044
2022/0036362 A1 2/2022 Warren et al.
2022/0297016 A1* 9/2022 Benedetto ............... A63F 13/87
2023/0016914 A1* 1/2023 Nelson ................ G07F 17/3213
2023/0146435 A1 5/2023 Sharma et al.
2023/0418926 A1* 12/2023 Caruana ................ G06F 21/602
2024/0096172 A1 3/2024 Baerlocher et al.
2024/0203206 A1 6/2024 Nelson et al.
2024/0212427 A1 6/2024 Nelson et al.
2024/0212458 A1 6/2024 Nelson et al.
2024/0296714 A1 9/2024 Nelson et al.
2024/0333508 A1* 10/2024 Blasius ................. H04L 9/3213

* cited by examiner

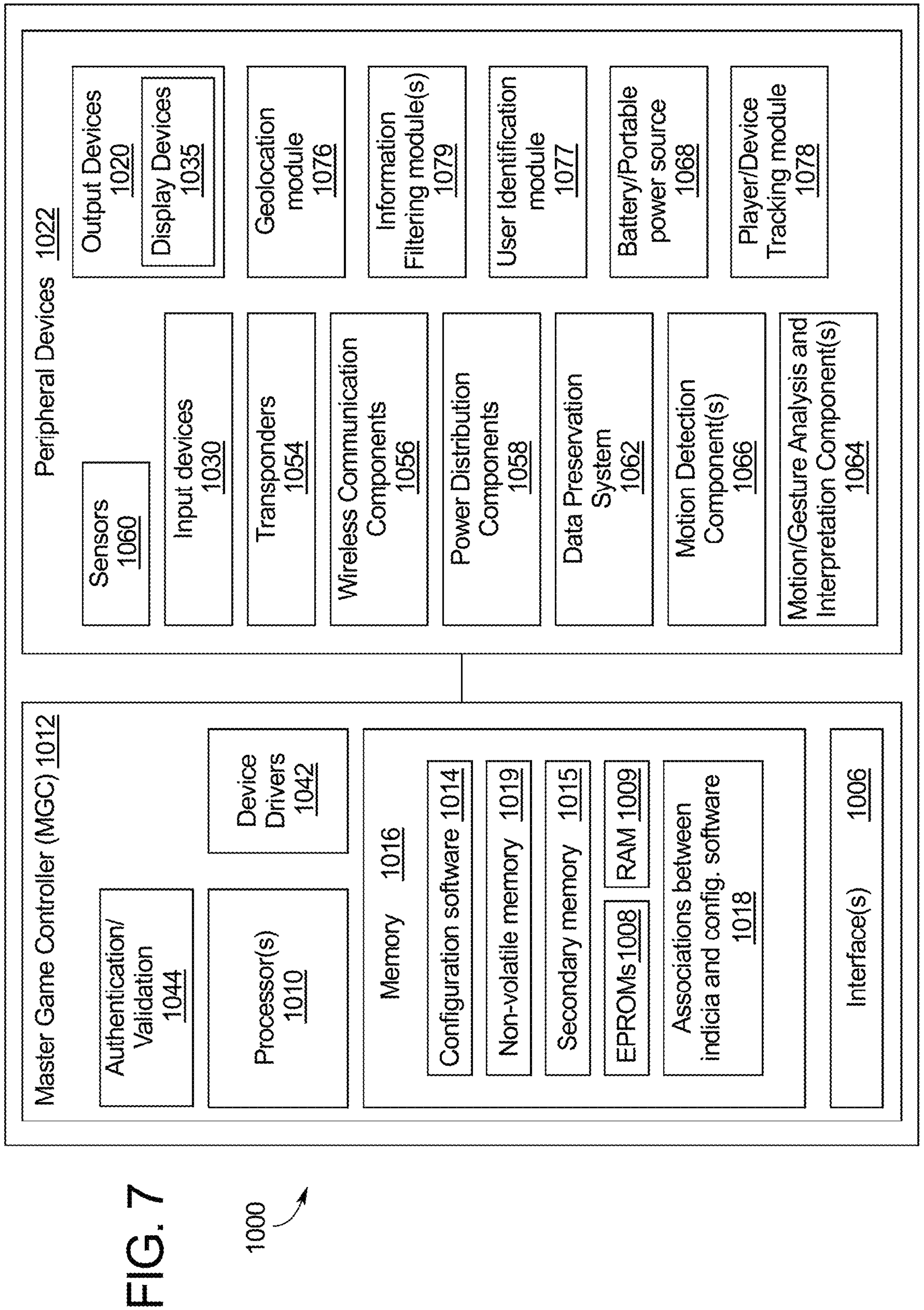

FIG. 7
1000
Master Game Controller (MGC) 1012
Authentication/ Validation 1044
Processor(s) 1010
Device Drivers 1042
Memory 1016
Configuration software 1014
Non-volatile memory 1019
Secondary memory 1015
EPROMs 1008
RAM 1009
Associations between indicia and config. software 1018
Interface(s) 1006
Peripheral Devices 1022
Sensors 1060
Input devices 1030
Transponders 1054
Wireless Communication Components 1056
Power Distribution Components 1058
Data Preservation System 1062
Motion Detection Component(s) 1066
Motion/Gesture Analysis and Interpretation Component(s) 1064
Output Devices 1020
Display Devices 1035
Geolocation module 1076
Information Filtering module(s) 1079
User Identification module 1077
Battery/Portable power source 1068
Player/Device Tracking module 1078

AUTHENTICATING DATA ACROSS DISTINCT REMOTE GAME SERVERS IN A GAME STREAMING ENVIRONMENT

CROSS-REFERENCE TO RELATED APPLICATIONS

This application is related to the following commonly owned co-pending patent applications: U.S. application Ser. No. 18/887,510, entitled "VALIDATION OF GAME OUTCOMES ACROSS DISTINCT REMOTE GAME SERVERS IN A GAME STREAMING ENVIRONMENT"; U.S. application Ser. No. 18/887,536, entitled "REMOTE GAME SERVER ORCHESTRATION OF OUTCOMES IN A GAME STREAMING ENVIRONMENT"; U.S. application Ser. No. 18/887,554, entitled "RECONCILIATION OF GAME OUTCOMES ACROSS DISTINCT REMOTE GAME SERVERS IN A GAME STREAMING ENVIRONMENT"; and U.S. application Ser. No. 18/887,577, entitled "ATTRIBUTING STREAMING DEVICE BENEFITS ACROSS DISTINCT REMOTE GAME SERVERS IN A GAME STREAMING ENVIRONMENT".

BACKGROUND

In various embodiments, the systems and methods of the present disclosure determine whether data determined by a first remote game server in association with a play of a wagering game displayed by a streaming device is authentic data and based on that determination, either cause a communication of determined authentic data to a second remote game server operating with a client device or store determined unauthentic data without communicating any data to the second remote game server operating with the client device.

Gaming machines may provide users awards in primary games. Gaming machines generally require the user to place a wager to activate the primary game. The award may be based on the user obtaining a winning symbol or symbol combination and on the amount of the wager.

BRIEF DESCRIPTION OF THE SEVERAL VIEWS OF THE DRAWINGS

FIG. 7 is a schematic block diagram of one embodiment of an electronic configuration of an example electronic gaming machine of the present disclosure.

DETAILED DESCRIPTION

Figure 1A:
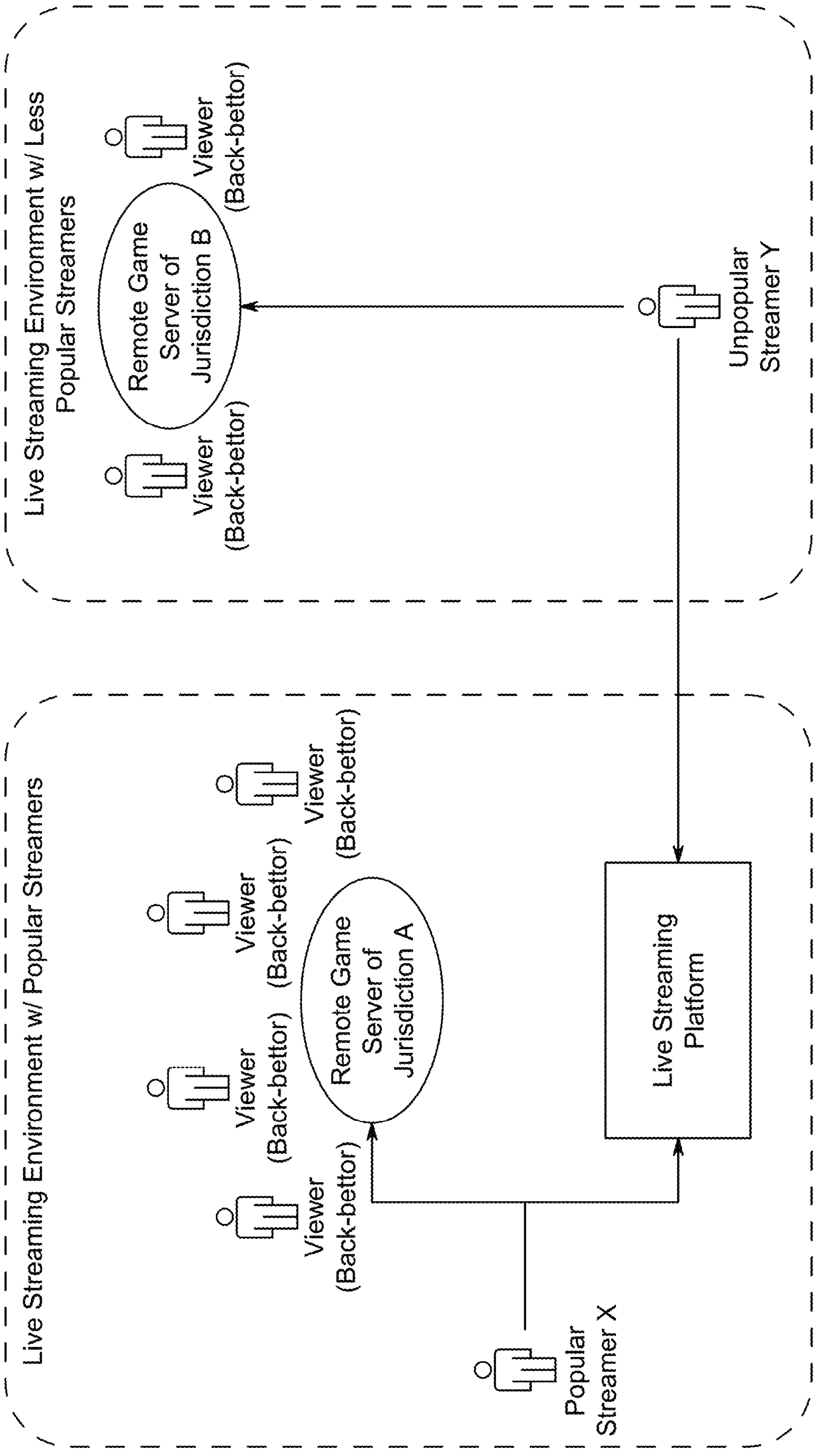
FIG. 1A is an example configuration illustrating the limitations of how different remote game server systems respectively associated with a live streaming platform operated relative to each other prior to the present disclosure.

In various embodiments, the systems and methods of the present disclosure determine whether data determined by a first remote game server in association with a play of a wagering game displayed by a streaming device is authentic data and based on that determination, either cause a communication of determined authentic data to a second remote game server operating with a client device or store determined unauthentic data without communicating any data to the second remote game server operating with the client device.

In certain embodiments, the systems of the present disclosure enable a user of a client device operating with one remote game server the opportunity to wager on plays of games occurring at a streaming device operating with another remote game server and/or enable the user of the client device to interact with a user of the streaming device. In such embodiments in which a user of a streaming device associated with one remote game server is playing one or more games from an online gaming establishment (for fiat currency and/or social currency) and one or more users of one or more client devices associated with a different remote game server are viewing a live stream of such games and/or placing wagers to play along with the user of the streaming device, the employment of multiple remote game servers (potentially across multiple jurisdictions with different regulations in effect) requires various technical protocols to ensure the integrity of game outcomes (generated from one remote game server and viewed and/or wagered on via another remote game server) and to further ensure that funds are properly credited and/or debited with the player account management systems associated with each respective remote game server. Moreover, such employment of multiple remote game servers requires that game play history and/or wagering history are properly accounted for and that reconciliation/audit activities are properly supported without introducing significant technical burdens and inefficiencies.

Since games played over the internet for fiat currency (i.e., real money gaming or iGaming) represents an emerging gambling application across many jurisdictions, certain technical challenges exist in developing a live streaming system that is composed of streaming devices operating from multiple jurisdictions as well as client devices operating from multiple jurisdictions. The present disclosure offers various technical solutions regarding ways in which the live streaming platform interfaces, directly or indirectly, with client devices and/or streaming devices in different jurisdictions that each permit iGaming but are unable to foster interjurisdictional operations due to certain security concerns with the communication of data between such systems. The present disclosure also offers various technical solutions regarding ways the live streaming platform interfaces, directly or indirectly, with client devices and/or streaming devices in different jurisdictions certain of which permit iGaming and certain of which prohibit iGaming.

By way of background, prior to the present disclosure, while different jurisdictions respectively enabled iGaming, within each jurisdiction, users of client devices were limited to wagering on streamed games (and/or committing to other monetary transactions) from streaming devices within the same jurisdiction and/or interfacing with the same remote game server. Since a small percentage of users of streaming devices historically receive a disproportionate amount of the viewership (i.e., the top 2% of users of streaming devices receive 90%+ of the views from users of client devices), such limitations not only isolated the users of client devices but penalized users of client devices in jurisdictions without relatively popular users of streaming devices. For example, as seen in FIG. 1A, the disconnect between remote game servers in different jurisdictions resulted in users of client devices in a live streaming environment not associated with such a top streamer (and rather limited to only options of an unpopular streamer) having no access to wager on streamed games (and/or commit to other monetary transactions) originating from the relatively popular user of a streaming device (i.e., a popular streamer) in another jurisdiction. In this example, not only were the options of the users of the client devices in the live streaming environment with less popular streamers limited (e.g., an inability to wager on streamed games from a streaming device connected to a remote game server separate from the remote game server connected to the client device or wagering on such streamed games limited to using social currency), but the technical limitations of certain prior streaming systems and various security concerns associated with connecting different remote game servers provided that a popular streamer lacked access to enable wagering by users and/or provide benefits (e.g., gifts) to users of client devices outside the live streaming environment of that popular streamer.

Figure 1B:
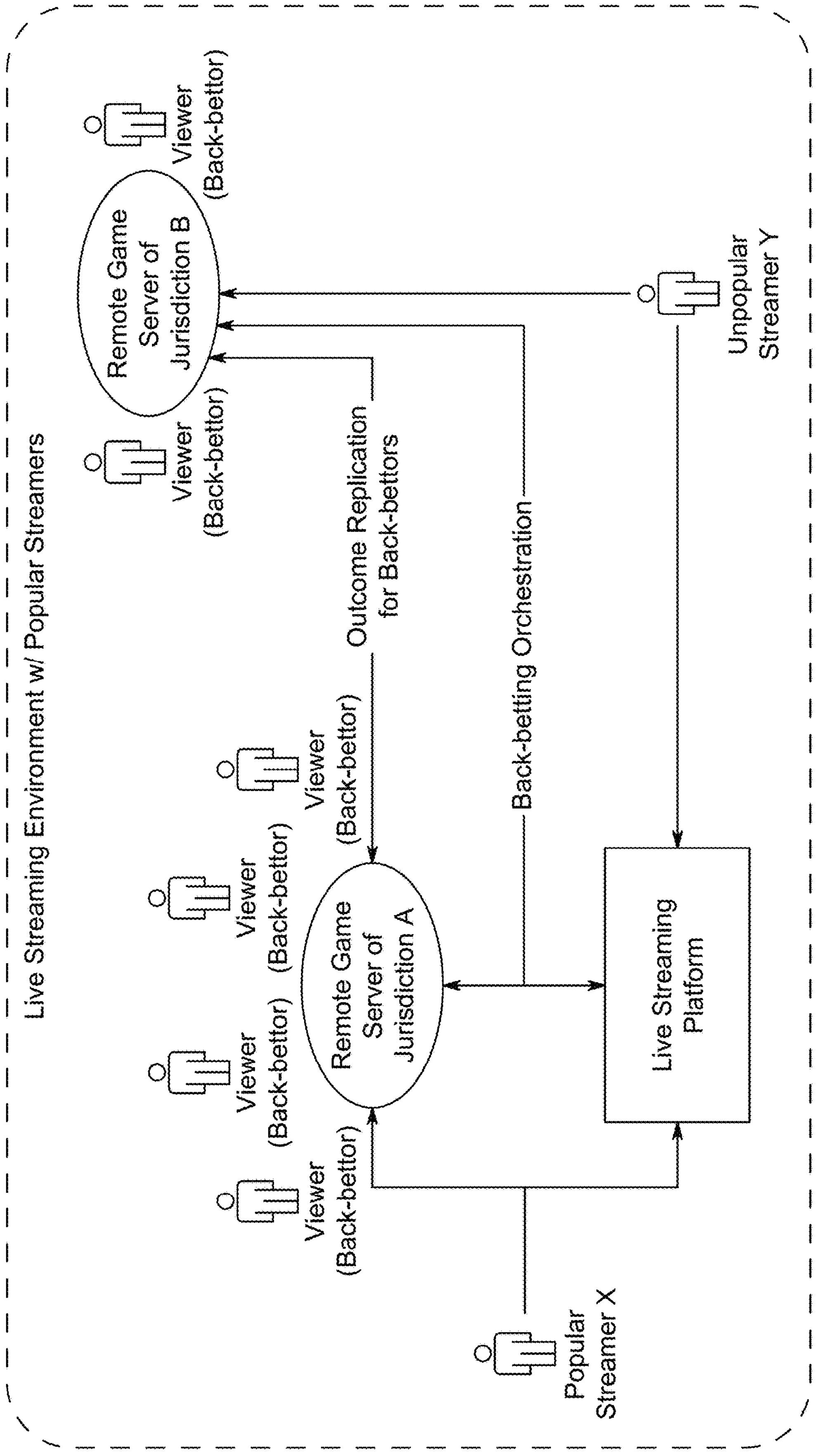
FIG. 1B is an example configuration illustrating the architecture of how different remote game server systems respectively associated with a live streaming platform operate relative to each other in accordance with the present disclosure.

Against the backdrop of current limitations of live streaming environments across multiple jurisdictions, in certain embodiments, the system operates to coordinate operations between different remote game servers in different jurisdictions (that each permit iGaming) to expand the connection between users of the streaming devices in these different jurisdictions and/or users of the client devices in these different jurisdictions. In these embodiments, the system accounts for various security concerns/data protection concerns associated with connecting different remote game servers in removing the barriers between different live streaming environments and thus drastically improves the options of users of client devices in relation to at least placing wagers on streamed games from streaming devices connected to a remote game server separate from the remote game server connected to the client device. For example, as seen in FIG. 1B, via the secure replication and/or the secure distribution of game outcomes between devices operating in different live streaming environments and the orchestration of certain wagers placed via the live streaming platform, users of client devices in a live streaming environment associated with an unpopular streamer have access to wager on streamed games (and/or commit to other monetary transactions) of a popular streamer in another jurisdiction associated with another remote game server. Such a configuration supplies users of streaming devices to a community of users of client devices spread across many jurisdictions operating with many remote game servers while securely removing certain roadblocks from preventing users of such streaming devices from streaming on the live streaming platform.

In addition to providing various technical solutions to securely foster interjurisdictional operations between different live streaming environments, in certain embodiments, the system operates to account for the relative location of one or more streaming devices and/or one or more client devices in determining certain functionality permitted by users of the streaming devices and/or users of the client devices. For example, a streamer (i.e., a user of a streaming device) that has built a following on a live streaming platform may live in a first jurisdiction where iGaming is not currently permitted. In this example, to account for a significant quantity of viewers (i.e., users of client devices that stream the streaming session(s) of the streamer) that regularly place wagers on the plays of the games during a streaming session living in various other domestic and international jurisdictions where iGaming is currently permitted, the system of the present disclosure employs the respective location of the streaming device and/or the client device in determining how such devices interface with the live streaming platform and with each other. That is, to enable users of streaming devices access to users of client devices associated with different remote game servers, the present disclosure enables such users of streaming devices the opportunity to broadcast streams originating from a remote game server of a source market to remote game servers of other markets while accounting for the respective jurisdictional requirements in each market.

In certain embodiments, to account for different regulations and/or operational permissions in different jurisdictions associated with the client device and the streaming device as well as certain security concerns that arise with certain inter-jurisdictional transactions, the system operates to replicate the game outcome from a remote game server associated with a streaming device to a remote game server associated with a client device. In operation of these embodiments, a streaming device operates with a first remote game server to play a game and the streaming device interfaces with a live streaming platform to notify the live streaming platform of such a play of the game. In these embodiments, when one or more individual wagers are placed on the play of the game from a client device operating with a second remote game server, the live streaming platform operates with the first remote game server to validate the wager information and/or the game outcome information of the streaming device. The live streaming platform then notifies the second remote game server of the validated wager information and/or game outcome information of the streaming device to enable the second remote game server to resolve the individual wager placed by the client device. As such and since a client device and a streaming device may be operating in different remote game server environments with different regulatory concerns, when a wager is placed at a client device on a play of a game at a streaming device that is part of a streaming session facilitated by the live streaming platform, to securely reconcile these different remote game server environments, the system of certain embodiments employs the live streaming platform to facilitate a secure validation of a game outcome from the remote game server environment of the streaming device to the remote game server of the client device to enable the client device to display a validated replay of the game outcome from the streamer device.

In certain embodiments, to account for different regulations and/or operational permissions in different jurisdictions associated with the client device and the streaming device as well as certain security concerns that arise with certain inter-jurisdictional transactions, the system operates to enable a remote game server associated with a streaming device to directly distribute a game outcome to another remote game server associated with a client device. In operation of these embodiments, a streaming device operates with a first remote game server to play a game and the first remote game server securely distributes at least game outcome information to a second remote game server associated with a client device independent of any live streaming platform. In certain instances, when an individual wager is placed on the streamed play of the game in association with the client device, the live streaming platform operates to record the wager placed from the client device, but the distribution of the game outcome information from the streamed play of the game remains via remote game server to remote game server communications. As such and since a client device and a streaming device may be operating in different remote game server environments with different regulatory concerns, when a wager is placed at a client device on a play of a game at a streaming device that is part of a streaming session facilitated by the live streaming platform, to reconcile these different remote game server environments, the system of certain embodiments employs one remote game server directly communicating with another remote game server to enable a client device to display a game outcome from a streamer device.

Accordingly, in various embodiments, the system of the present disclosure enables a user of a streaming device to stream content, including plays of iGaming games, from one market or jurisdiction, while enabling users of client devices in other markets or jurisdictions to, amongst other interactions, place wagers on such iGaming games. In certain such embodiments in which the streaming device and the client device are operating with different remote game servers, the system of the present disclosure employs a live streaming platform to secure the replication of game outcomes from the remote game server associated with the streaming device to one or more remote game servers of one or more client devices (which then locally replay the replicated game outcome to their respective client devices and operate with one or more systems to at least ensure funds are properly debited for each client device wager placed and credited for each client device win (if applicable)). In certain other embodiments in which the streaming device and the client device are operating with different remote game servers, the system of the present disclosure employs the secure distribution of game outcomes from the remote game server associated with the streaming device directly to one or more remote game servers of one or more client devices (which then locally replay the distributed game outcome to their respective client devices and operate with one or more systems to at least ensure funds are properly debited for each client device wager placed and credited for each client device win (if applicable)). Such configurations thus provide a robust live streaming system that enables users of streaming devices the opportunity to broadcast streams originating from a remote game server of a source market or jurisdiction which is operable (or integrated) with one or more remote game servers in one or more markets or jurisdictions of one or more client devices which are operable (or integrated) with one or more distinctly operating remote game servers.

In various embodiments, the present disclosure is directed to a system including various components and/or subsystems that operate individually and/or collectively to enable a first user to participate in a live stream of their gaming experience and potentially reap certain benefits (in the form of awards, notoriety and interactions with other users) associated with such participation. In various such embodiments, the various components and/or sub-systems operate individually and/or collectively to capture live stream data and upload the captured live stream data. The various components and/or sub-systems additionally or alternatively operate individually and/or collectively to enable one or more second users to view and/or interact with the captured live stream and/or a modification of the captured live stream to also potentially reap certain benefits (in the form of awards, notoriety and interactions with other users).

In various embodiments, the live streaming system of the present disclosure employs a streaming device, such as a streaming personal gaming device or a streaming electronic gaming machine, which enables a first user (e.g., a streamer or influencer at a streaming device) to participate in one or more gaming sessions. In these embodiments, the live streaming system of the present disclosure further employs a client device, such as a viewing personal gaming device or a viewing electronic gaming machine, that enables a second user (e.g., a viewer or follower at a client device) to view, interact with and/or participate in the one or more gaming sessions occurring at the streaming device. In such embodiments, the streaming device and/or a remote game server operating with the streaming device communicates data associated with the gaming sessions and/or data associated with the first user which is independent of the gaming sessions to one or more components of a live streaming platform. The one or more components of the live streaming platform utilize the communicated data to offer various features and functions to the second users at the client devices.

Figure 2:
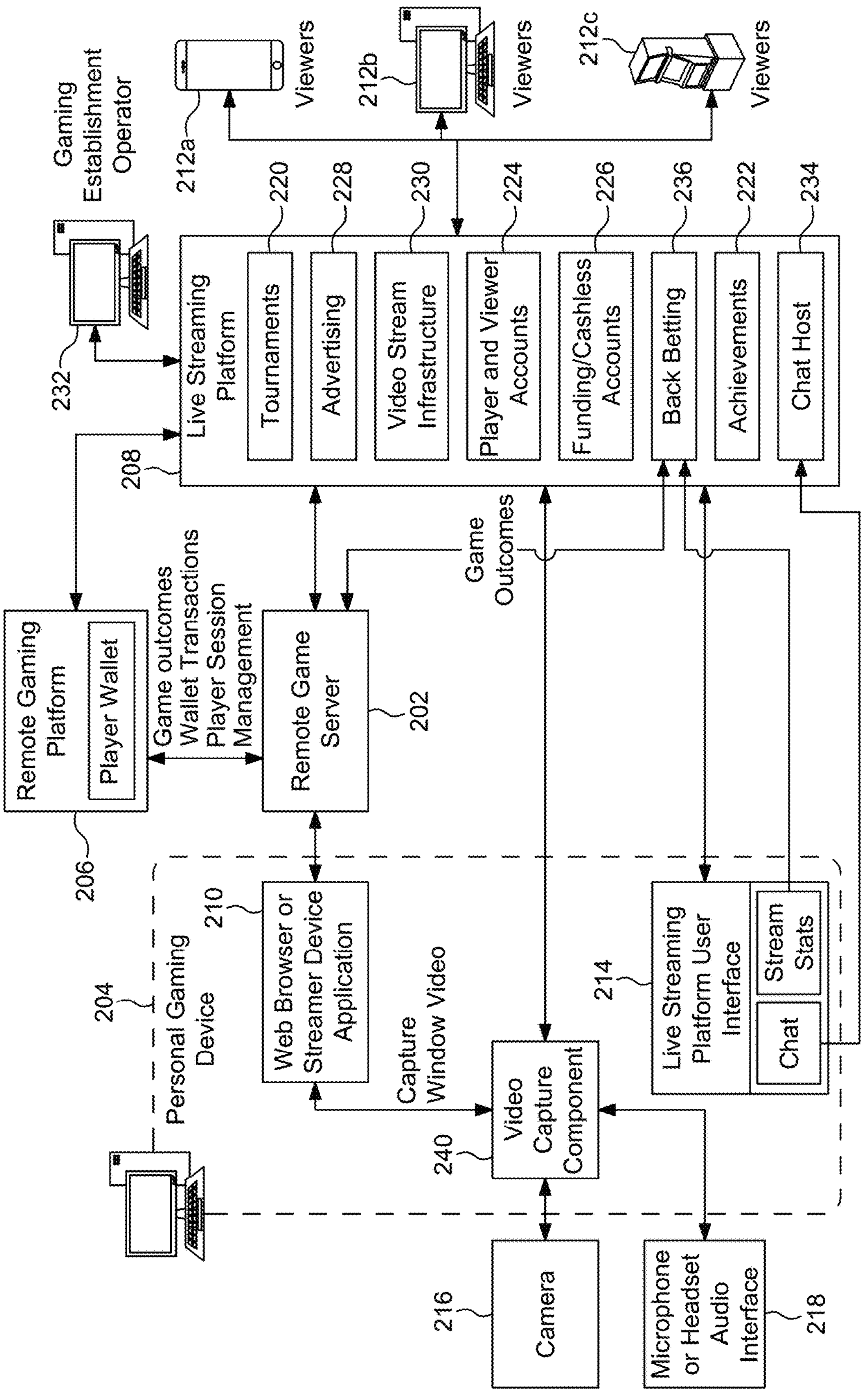
FIG. 2 is an example configuration of an architecture of a plurality of different components of the system of the present disclosure.

In certain embodiments, the streaming device and/or the client device comprises a personal gaming device. In certain such embodiments in which the personal gaming device operates as the streaming device, the personal gaming device operates with a remote game server to offer one or more plays of one or more iGaming games independent of any electronic gaming machine ("EGM") and independent of any component of a gaming establishment management system in communication with an EGM, such as a slot machine interface board ("SMIB") associated with the EGM. In certain such embodiments, the personal gaming device and/or remote game server interacts with the live streaming platform to facilitate the live streaming system of the present disclosure as well as foster any interactions between a user of the personal gaming device and/or one or more viewers. In these embodiments, the personal gaming device and/or remote game server communicate data regarding one or more aspects of a gaming session to one or more components of the live streaming platform which operate to publish content to zero, one or more client devices. For example, as seen in FIG. 2, the system employs a remote game server 202 that operates with a personal gaming device 204, such as a mobile device or a personal computer, and remote gaming platform 206 (which interacts with the live streaming platform 208) to enable, via an internet browser or application 210 of the personal gaming device, a live stream of one or more events occurring in association with the personal gaming device 204, one or more events occurring in association with the remote game server 202 and/or one or more interactions between the personal gaming device 204 and one or more client devices 212*a*, 212*b*, 212*c*.

In certain embodiments, the streaming device playing one or more iGaming games and/or the client device comprises an EGM including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities). In certain such embodiments, the EGM operating as the client device interacts with the live streaming platform to facilitate the live streaming system of the present disclosure as well as foster any interactions between a user of the EGM and/or one or more users of one or more streaming devices. In certain embodiments, the streaming device playing one or more iGaming games and/or the client device comprises a component of a gaming establishment management system in communication with an EGM, such as a SMIB in communication with an EGM. In certain additional or alternative embodiments, the streaming device playing one or more iGaming games and/or the client device comprises another component that is in communication with an EGM and that operates independent of a gaming establishment management system. In certain such embodiments, the device operating as the streaming device interacts with the live streaming platform to facilitate the live streaming system of the present disclosure as well as foster any interactions between a user of the streaming device and/or one or more viewers.

In certain embodiments, upon an occurrence of a user identification event, the system enables a user at a streaming device to log into a live streaming platform account associated with the user. In certain embodiments wherein the system is separate from and not in communication with a gaming establishment player tracking system, the user identification occurs in association with a user logging into the live streaming platform from the streaming device (such as by the user entering an identification and password or login code at the streaming device). In this embodiment, the streaming device communicates the user identification data to one or more components of the live streaming platform which log the user into the live streaming account associated with the user. In different embodiments, the user logs into a live streaming platform account via one or more of: the user inserting a live streaming platform identification card (that has an encoded user identification number that uniquely identifies the user) into a card reader of the streaming device; the user inserting a player tracking card that functions as a live streaming platform identification card (that has an encoded user identification number that uniquely identifies the user) into a card reader of a streaming device; an establishment of a wireless communication link between the streaming device and a mobile device executing an application associated with an identified user; the utilization of any suitable biometric technology or ticket technology to identify a user associated with a gaming session occurring at a streaming device. In certain embodiments, in which the system includes or is otherwise in communication with a gaming establishment player tracking system of a gaming establishment management system, the user identification occurs in association with a user logging into the player tracking system. In these embodiments, the streaming device communicates the user identification data to one or more components of the live streaming platform (e.g., a server of the live streaming platform) which log the user into a live streaming account associated with the user and maintained in association with the live streaming platform.

In certain embodiments, in association with a user logging into a live streaming platform account of the live streaming platform from a streaming device, the system enables the user to enable/disable certain components of the streaming device. In certain embodiments, in association with a user logging into a live streaming platform account of the live streaming platform from a streaming device, the system enables the user to modify the settings or parameters of certain components of the streaming device. In these embodiments, as seen in FIG. 2, as part of configuring the streaming device to operate with the live streaming platform, the system utilizes a live streaming platform user interface 214 to enable a user to modify zero, one or more aspects of the streaming device as they relate to how the streaming device operates with the live streaming platform.

In one such embodiment, the system enables the user to modify the use of one or more display devices of the streaming device and/or one or more display devices separate from, but associated with, the streaming device. For example, the system enables the user to enable or disable one or more display devices of the streaming device from displaying the images captured by the streaming device which are displayed to the viewers. In another example, the system additionally or alternatively enables the user to modify the settings of the display device(s) of the streaming device, such as modifying the screen layout of the streaming device by selecting an area of the display device to display the live stream displayed to the viewers, or modifying whether to utilize a split screen to display the live stream displayed to the remote users.

In another such embodiment, the system enables the user to modify the use of one or more cameras of the streaming device and/or one or more cameras separate from, but associated with, the streaming device. For example, as seen in FIG. 2, since one or more cameras 216 of the streaming device may be used to capture data of the user playing the streaming device, the system enables the user to enable or disable the camera(s) of the streaming device from capturing one or more images of the user playing the streaming device. In another example, the system additionally or alternatively enables the user to modify the settings of the camera(s) of the streaming device, such as modifying the resolution of the camera, modifying the color settings of the camera (e.g., to capture images in color or black and white), modifying the use of a green screen.

In another such embodiment, the system enables the user to modify the use of one or more sound generating devices, such as speakers, of the streaming device and/or one or more sound generating devices separate from, but associated with, the streaming device. For example, since one or more speakers of the streaming device may be used to generate sounds communicated from one or more viewers at one or more client devices, such as comments made by one or more viewers, the system enables the user to enable or disable the speaker(s) of the streaming device. In another example, the system additionally or alternatively enables the user to modify the settings of the speaker(s) of the streaming device, such as modifying the volume of the speakers.

In another such embodiment, the system enables the user to modify the use of one or more sound capture devices, such as microphones, of the streaming device and/or one or more sound capture devices separate from, but associated with, the streaming device. For example, since one or more microphones of the streaming device may be used to capture the sounds at the streaming device, such as comments made by the user, the system enables the user to enable or disable the microphone(s) of the streaming device. In another example, the system additionally or alternatively enables the user to modify the settings of the microphone(s) of the streaming device, such as modifying the sensitivity of the microphone(s).

In another embodiment, in addition to or alternatively from modifying the settings of one or more components of the streaming device and/or components separate from, but associated with, the streaming device, the system enables a user to connect or otherwise pair a peripheral device with the streaming device and utilize the connected peripheral device in association with the capturing of data for the live stream. That is, the system of this embodiment enables the user to connect one or more peripherals to the streaming device to further enhance the broadcasting experience.

In one embodiment, the peripheral device includes a mobile device (with or without a camera) wherein the system enables a user to wirelessly connect or otherwise pair the mobile device to the streaming device such that the user can interact with their audience of viewers using the mobile device. In one such embodiment, the wireless communication link includes a direct pairing such that when the user of the mobile device is currently located at or otherwise engaging with a streaming device, a direct pairing or linkage occurs between the mobile device and the streaming device utilizing one or more wireless communication protocols, such as Bluetooth™ signals, Bluetooth™ Low Energy ("BLE") signals, one or more cellular communication standard (e.g., 3G, 4G, 5G, 6G, LTE) signals, one or more Wi-Fi compatible standard signals and/or one or more short range communication signals, such as near field communication ("NFC") signals protocol). In another such embodiment, the wireless communication link includes an indirect pairing such that when the user of the mobile device is currently located at or otherwise engaging with a streaming device and wirelessly connected to one or more servers, such as servers of a gaming establishment, an indirect pairing or linkage occurs between the mobile device and the streaming device via the one or more servers. In another embodiment, in addition to or alternative from using the mobile device as a peripheral device associated with the streaming device, the system enables the user to utilize a paired mobile device (which is running a mobile device application configured to interface with the streaming device) to display a live streaming platform user interface such that the user can adjust one or more settings on the streaming device which pertain to the live stream.

In another embodiment, the peripheral device includes a headset (including a microphone) wherein the system enables a user to connect or otherwise pair the headset (e.g., headset audio interface 218 of FIG. 2) to the streaming device such that the user can speak with their audience of viewers at client devices. In this example, if the headset is a wired headset, the system enables the user to connect to the streaming device over USB Audio, standard analog headphone and speaker jacks, or optical inputs and outputs. On the other hand, if the headset is a wireless headset, the system enables the user to connect to the streaming device via establishing a wireless communication link with the headset. In these embodiments, if the peripheral device requires a power source, the system further enables the user to power such connected peripheral devices via one or more USB power outlets and/or wireless charging devices.

In certain embodiments, in addition to enabling a user to connect a peripheral device to the streaming device, the system adjusts one or more settings of the streaming device responsive to the detection of a connected peripheral device. For example, upon the streaming device detecting that headphones are connected, the system mutes one or more speakers of the streaming device and routes one or more sound outputs to the headphones so that the risk of echo when the user is speaking into their headphone microphone is minimized. In one such example, the system routes all sound outputs to the headphones. In another such example, the system routes certain sound outputs to the headphones but continues routing other sound outputs, such as sounds associated with large jackpots, sounds occurring during certain in-game bonuses, or other sounds that contribute to the general ambiance of the gaming establishment for exciting events, to the speakers of the streaming device.

It should be appreciated that while certain adjustments to one or more components of the streaming device occur in association with a user logging into a live streaming platform account of the live streaming platform, in certain additional embodiments, one or more adjustments to one or more components of the streaming device occur based on the live stream of the user's gaming session. In these embodiments, the streaming device displays (either continuously or responsive to one or more inputs made by the user during the user's gaming session) one or more live streaming platform user interfaces which enable the user to change one or more configurations of the streaming device that pertain to the broadcasted live stream of the user's gaming session. For example, since one or more display devices of the streaming device and/or speakers of the streaming device may be utilized to provide the user the live stream which is broadcasted to one or more viewers at client devices, the system gives the user of the streaming device instant feedback and enables the user to modify one or more settings of any suitable component utilized to produce the live stream, such as a camera of the streaming device, a camera paired with the streaming device, a microphone of the streaming device or a microphone paired with the streaming device.

In another embodiment, in addition to or alternatively from adjusting one or more settings of the streaming device based on the feedback of the user, the system displays to the user certain information regarding the user's live stream to provide the user at the streaming device a more immersive experience to foster more interaction with the viewers at the client devices. For example, the streaming device utilizes a user feedback display to display to the user statistics about how many viewers are viewing the user's play online at the current point in time. In another example, the streaming device utilizes a user feedback display to inform the user at the streaming device of a current live chat associated with the user's gaming session so that the user can respond (using a microphone to provide comments and/or answer requests from viewers). In another example, the streaming device utilizes a user feedback display to display non-game play statistics for the play session, such as total gifts given, gifts given to charity, or any award given to the user by viewers. In different embodiments, the system displays none, part or all of the information of this user feedback display to the viewers of the live stream.

In certain embodiments, following the occurrence of the user identification event and any modifications to any components of (or associated with) the streaming device, one or more components of the system of the present disclosure monitor for an occurrence of a capture event that potentially results in the generation of content to be streamed to one or more viewers at one or more client devices. In these embodiments, responsive to an occurrence of a capture event, the system captures live stream data associated with the gaming session occurring at the streaming device. In certain embodiments, the live stream data comprises audio/visual content generated by the streaming device and/or captured by the streaming device. In certain embodiments, the live stream data additionally or alternatively comprises streaming device data associated with the gaming session and/or the streaming device, such as, but not limited to, meter data (e.g., money in, money out, money wagered, money won), configuration data (e.g., manufacturer, denomination, paytable data), bonusing data (e.g., progressive win, system bonus win), ticket in/ticket out data, and/or cashless fund transfer data.

In certain embodiments, the system captures the content generated by the streaming device, such as content displayed by one or more display devices of the streaming device, to broadcast to the viewers (with the possible addition of supplemental content). In another such embodiment, the system captures certain content generated by the streaming device, such as content displayed by areas or windows of one or more display devices of the streaming device, to broadcast to the viewers (with the possible addition of supplemental content). In this embodiment, rather than displaying to the viewers all the content which the user at the streaming device sees (which may include external controlled interface content personal to the user or other sensitive content not intended to be broadcasted), the system captures certain content, such as a game play content, and does not capture certain other content.

In certain embodiments, following the capture of live stream data, the system determines whether a captured data modification event has occurred. That is, after obtaining the data associated with the content generated by the streaming device which forms at least part of the live stream and prior to enabling any viewers access to that particular captured data of the live stream, the system determines whether one or more events have occurred to augment such content by changing part of the content, removing part of the content and/or adding to the content.

If the system determines that a captured data modification event occurred, the system modifies the live stream data captured from the streaming device. In other words, upon an occurrence of a modification event and prior to enabling any viewers access to that particular captured data of the live stream, the system modifies or otherwise alters the data captured from the streaming device to supplement the live stream with additional information. In various embodiments, supplemental content derived from this additional information is added to the live stream by overlaying the supplemental content onto a captured frame of a display device of the streaming device and/or separately displaying the supplemental content along with a captured frame of a display device of the streaming device such that the live stream includes audio-visual content of the user's gaming session as well as the additional information.

In certain embodiments, the additional information utilized to form the supplemental content added to the live stream includes one or more of: still images (e.g., a photograph of a user's reaction during a play of a game), video clips (e.g., a video of a user's reaction to a play of a game), sound clips (e.g., a user's verbal reaction to a play of a game), augmented still images (e.g., an augmented photograph of a user's reaction during a play of the game, such as the user's reaction modified via one or more filters or superimposed with an outcome of a play of the game), augmented video clips (e.g., an augmented video recording of a user's reaction to a play of a game), augmented sound clips (e.g., a user's augmented verbal reaction to a play of a game), audio-video clips, text, non-wagering transaction information associated with the user (e.g., an amount spent purchasing goods at a gaming establishment's luxury clothing store), location information, application usage information, event attendance information, and/or biometric information. In certain embodiments, the system informs the user of the publication of this additional information. In certain of such embodiments, the system enables the user to opt-out of (or alternatively opt-into) this feature as well as enables the user to configure notifications of when such additional information is to be published.

In another embodiment, the additional information utilized to form the supplemental content added to the live stream includes details about the user's current (or historical) gaming session, such as, but not limited to, a largest award amount won in the gaming session, a duration of the gaming session, an average amount wagered for the gaming session, a total amount wagered for the gaming session, a total amount won for the gaming session, an average amount won for the gaming session, and/or any jackpots won for the gaming session.

In another embodiment, the additional information utilized to form the supplemental content added to the live stream includes details about one or more tournaments the user is currently participating in (or historically participated in). In this embodiment, multiple users participate in a gaming establishment tournament where users compete to determine who will win the tournament and one or more users in the tournament stream their play live using the live streaming platform of the present disclosure. For example, the system offers a tournament to eligible viewers (e.g., viewers that pay a fee or have a relationship with the user of a streaming device) in which wagers are placed by client devices over a period of time and the client device with the largest win at the end of the period is the winner of the tournament. In such a configuration, the live streaming platform is linked to the system running the tournament and tracking the score of the streaming devices that are participating. The live streaming platform uses the data published by the tournament system, such as a tournament manager server, to display additional information regarding any streamed tournaments (e.g., tournaments 220 offered in association with the live streaming platform of FIG. 2). Such additional information includes, but is not limited to, a current leaderboard of the tournament, a current standing in the tournament (i.e., the user's current position on the leaderboard of the tournament), a largest award amount won in the tournament, a duration of the tournament, an average amount wagered in the tournament, a total amount wagered in the tournament, a total amount won in the tournament, an average amount won in the tournament, and/or any jackpots won in the tournament.

In another embodiment, the additional information utilized to form the supplemental content added to the live stream includes details about any achievements earned or otherwise associated with the user and/or the user's current (or historical) gaming session. In this embodiment, the system utilizes game outcome data published by the streaming device to the live streaming platform to associate the user of the streaming device (and/or the user of the client device) with one or more achievements such as badges, avatars, access to one or more emojis, awards (in the form of monetary credits, non-monetary credits, physical goods, and/or any award of the present disclosure). The system causes information about such achievements (e.g., achievements 222 maintained in association with the live streaming platform of FIG. 2) to be overlaid onto or displayed along with the captured frames. In different embodiments, such achievements are earned or otherwise associated with the user based on the historical play statistics of the user and/or the historical play statistics of the user relative to the historical play statistics of one or more other users (to determine how each user has relatively performed during one or more gaming sessions). It should be appreciated that while such achievements may be based on game outcome data of a wager amount and any awards, game outcome data may additionally be based on any trackable event occurring in association with a play of a game (e.g., for a play of poker game, the game outcome data includes the hand of playing cards initially dealt, the playing cards held by the user, the final hand of playing cards and any associated award), or occurring independent of any play of any game but otherwise associated with the user's gaming session.

In another embodiment, the additional information utilized to form the supplemental content added to the live stream includes details about a quantity of viewers currently viewing the user's gaming session. In another such embodiment, the additional information includes historical details about a quantity of historical viewers whom has viewed the user's historic gaming sessions. In another embodiment, the additional information utilized to form the supplemental content added to the live stream includes details about a quantity of views of the user's gaming session. In another such embodiment, the additional information includes historical details about a quantity of historical views of the user's historic gaming sessions. In another embodiment, the additional information utilized to form the supplemental content added to the live stream includes details about a quantity of viewers following the user (i.e., a number of followers of the user). In another embodiment, the additional information utilized to form the supplemental content added to the live stream includes details about a quantity of subscribers associated with the user.

In another embodiment, the additional information utilized to form the supplemental content added to the live stream includes details about any gifts or awards sent to the user of the streaming device by one or more viewers of one or more client devices. In this embodiment, viewers can send monetary gifts to users as a virtual "thank you" for playing well, or performing some action requested by a viewer, wherein the system displays such gifts (either individually or collectively) such that the viewers see the live stream of the user's gaming session as well as information regarding such gifts. For example, a viewer congratulates the user for earning a royal flush in a poker game by gifting them $5. In another example, a viewer requests, through an online chat, that the user hold certain cards in a poker hand by gifting the user some amount of money. In another embodiment, one or more gifts given to users participating in the tournament by viewers impact a user's position in an ongoing tournament. For example, if a user has a credit meter balance of $500 after two minutes of play, and they're currently ranked $3^{rd}$ on the leaderboard, and an online viewer gifts that user $200, then the user may jump into $2^{nd}$ place on the leaderboard. It should be appreciated that these gifts are funded by electronic credits that viewers establish with the live streaming platform. That is, as seen in FIG. 2, the system of the present disclosure utilizes accounts associated with viewers 224 and/or accounts associated with streamers 226 that are maintained by one or more components of the live streaming platform and/or one or more components independent of but associated with the live streaming platform. In certain embodiments, the system employs such accounts to transfer funds to one or more digital accounts or electronic wallets and/or to one or more components of a gaming establishment fund management system that maintain one or more gaming establishment accounts, such as cashless wagering accounts, associated with such users. In different embodiments, such funds are transferred from an account associated with the viewer to an account associated with the user, from an account associated with the viewer to a cashless wagering account maintained for the user by a cashless wagering system of a gaming establishment, and/or from an account associated with the viewer to a credit balance of the streaming device (wherein such transfers are recorded using existing wagering account transfer or bonus meters tracked by a streaming device, or view additional meters added to track such transfers). In another embodiment, such funds are transferred from an account associated with a viewer to the streaming device wherein rather than such funds directly modifying a credit balance of the streaming device, such funds contribute to one or more game outcomes determined by the streaming device (e.g., a gift of $5 from a viewer is provided to the user at the streaming device as an award of $5 associated with a game outcome determined in association with a play of a game). It should be appreciated that any suitable digital wallet or account which maintains or is otherwise associated with an amount of funds for a user at a streaming device and/or a viewer may be utilized in association with the present disclosure.

In another embodiment, the additional information utilized to form the supplemental content added to the live stream includes details about any gifts provided to any charities associated with the user of the streaming device by one or more viewers at one or more client devices. In this embodiment, viewers can send monetary gifts to a charity of the user's choosing as a virtual "thank you" for playing well, or performing some action requested by a viewer, wherein the system displays such charitable gifts (either individually or collectively) such that the viewers see the live stream of the user's gaming session as well as information regarding such gifts. For example, a viewer congratulates the user for playing for a certain amount of time by providing a gift of $50 to a charity designated by the user. It should be appreciated that the charitable gift given by a viewer is funded by transferring money from an account that viewer established with the live streaming platform to one or more financial institution accounts associated with the charity and maintained by one or more financial institutions.

In another embodiment, the additional information utilized to form the supplemental content added to the live stream includes advertising data associated with a gaming establishment (e.g., a physical casino or an online casino) associated with the streaming device and/or a third party. For example, as seen in FIG. 2, the streaming device broadcasting the user's video stream operates with the live streaming platform 208 to encode an advertisement 228 for a gaming establishment in the video. For example, the gaming establishment advertisement includes an embedded audio/video clip, such as footage of the user at the streaming device or a promotional audio/video clip of a show attended by the user at a gaming establishment, along with attendance information regarding a user attending the show, the gaming establishment where the concert occurred and advertising text describing upcoming dates for the show. In these embodiments, the gaming establishment advertisement (and/or third party advertisement associated with the live stream) offers the viewers different benefits, such as awards, discounts, free points, free promotional credits at the gaming establishment for signing up for a visit to the gaming establishment, for viewing the live stream or associating the viewer's player tracking account with their viewer account. In different embodiments, different levels of activity by the viewers are associated with different benefits, wherein the benefit provided to the viewer is based on how much they watch, how many gifts they give users, or how many bets they place. In these embodiments, such benefits are funded by a gaming establishment if the gaming establishment that is hosting the user gets a percentage of the subscriptions to a user's channel, gifts, and/or bets (or a percentage of the hold associated with such bets).

In another embodiment, the additional information utilized to form the supplemental content added to the live stream includes details about an additional wager placed by the user at the streaming device. In one such embodiment, the streaming device enables users to place wagers on sporting events while at the streaming device, wherein the information regarding such sports wagers is broadcast as part of their live stream. In this embodiment, as the events associated with a sports wager made occur or finalize, the results of the sports wager are reported to the live streaming platform by the streaming device (or the sports betting system which maintains and tracks such wagers). Such reporting enables the live streaming platform to update the appropriate user statistics and possibly award the user any achievements as described above.

In certain embodiments, in addition to or alternatively from modifying the live stream data captured from the streaming device with additional information, the modification of the live stream data includes removing certain of the captured live stream data or otherwise altering the captured live stream data. In these embodiments, rather than displaying to the viewers all the content which the user at the streaming device sees (which may include external controlled interface content personal to the user or other sensitive content not intended to be broadcasted), the system obscures certain content prior to being broadcasted to any viewers. For example, if a streaming device is currently displaying a live video stream associated with a sporting event in a window of a display device of the streaming device and the live streaming platform lacks the content licenses to also display the live video stream of the sporting event, the system blacks out, grays out or otherwise masks the live video stream of the sporting event from being displayed to viewers.

Following the modification of the data captured from the streaming device or if the system determines that a captured data modification event did not occur, the system uploads the live stream data to the live streaming platform. In certain embodiments, the uploaded live stream data comprises unmodified captured live stream data (e.g., unmodified audio/visual content generated by the streaming device and/or content captured by the streaming device). In certain additional or alternative embodiments, the uploaded live stream data comprises modified captured live stream data (e.g., modified audio/visual content generated by the streaming device and/or modified content captured by the streaming device). In certain additional or alternative embodiments, the uploaded live stream data comprises streaming device data associated with the gaming session and/or the streaming device.

In certain embodiments in which the streaming device is a personal gaming device operating with a remote game server, as seen in FIG. 2, a video capture component 240 of the personal gaming device 204 uploads certain of the live stream data to the video stream infrastructure component 230 of the live streaming platform 208. In certain embodiments in which the streaming device comprises a personal gaming device 204 operating with a remote game server 202 and a remote gaming platform 206 that maintains one or more user accounts and operates with the remote game server to enable wagering of plays of games with funds held in such maintained user accounts, to enable the capturing of live stream data and communication of the live stream data to one or more components of the live streaming platform, a video capture component 240 associated with the personal gaming device interfaces with zero, one or more peripheral devices (e.g., camera 216 and headset audio interface 218) to capture certain data of the live stream. In these embodiments, the streaming personal gaming device (operating with the video capture component and employing certain data communicated from the remote game server and/or the remote gaming platform) encode video data outputted by the personal gaming device into one or more video formats for streaming and communicate that video data to one or more video stream infrastructure components 230 of the live streaming platform 208.

In certain embodiments in which the streaming device is an EGM playing one or more iGaming games, the live streaming platform manager associated with the EGM uploads certain of the live stream data to a video stream infrastructure component of the live streaming platform. In another embodiment in which the streaming device is a SMIB associated with an EGM playing one or more iGaming games, a live streaming application being executed by the SMIB uploads certain of the live stream data to the video stream infrastructure component of the live streaming platform. In certain embodiments in which the streaming device comprises a component of a gaming establishment management system, such as a SMIB associated with an EGM playing one or more iGaming games, to enable the streaming SMIB to capture live stream data from the EGM and communicate the live stream data to one or more components of the live streaming platform, the streaming SMIB comprises various hardware and/or software interfaces. In certain embodiments, the streaming SMIB includes zero, one or more video inputs with hardware interfaces (e.g., HDMI, DVI, VGA or Ethernet), zero, one or more audio inputs (e.g., 3.5 mm analog input or a fiber optic input) and zero, one or more communication interfaces (e.g., serial, Ethernet, fiber or wireless) with the EGM. In certain embodiments, the streaming SMIB includes zero, one or more connections to one or more servers of the live streaming platform and/or one or more servers of the gaming establishment management system. In these embodiments, the streaming SMIB operates with a video capture device to encode video data outputted by the EGM into one or more video formats for streaming and communicate that video data to one or more video stream infrastructure components of the live streaming platform.

Figure 3:
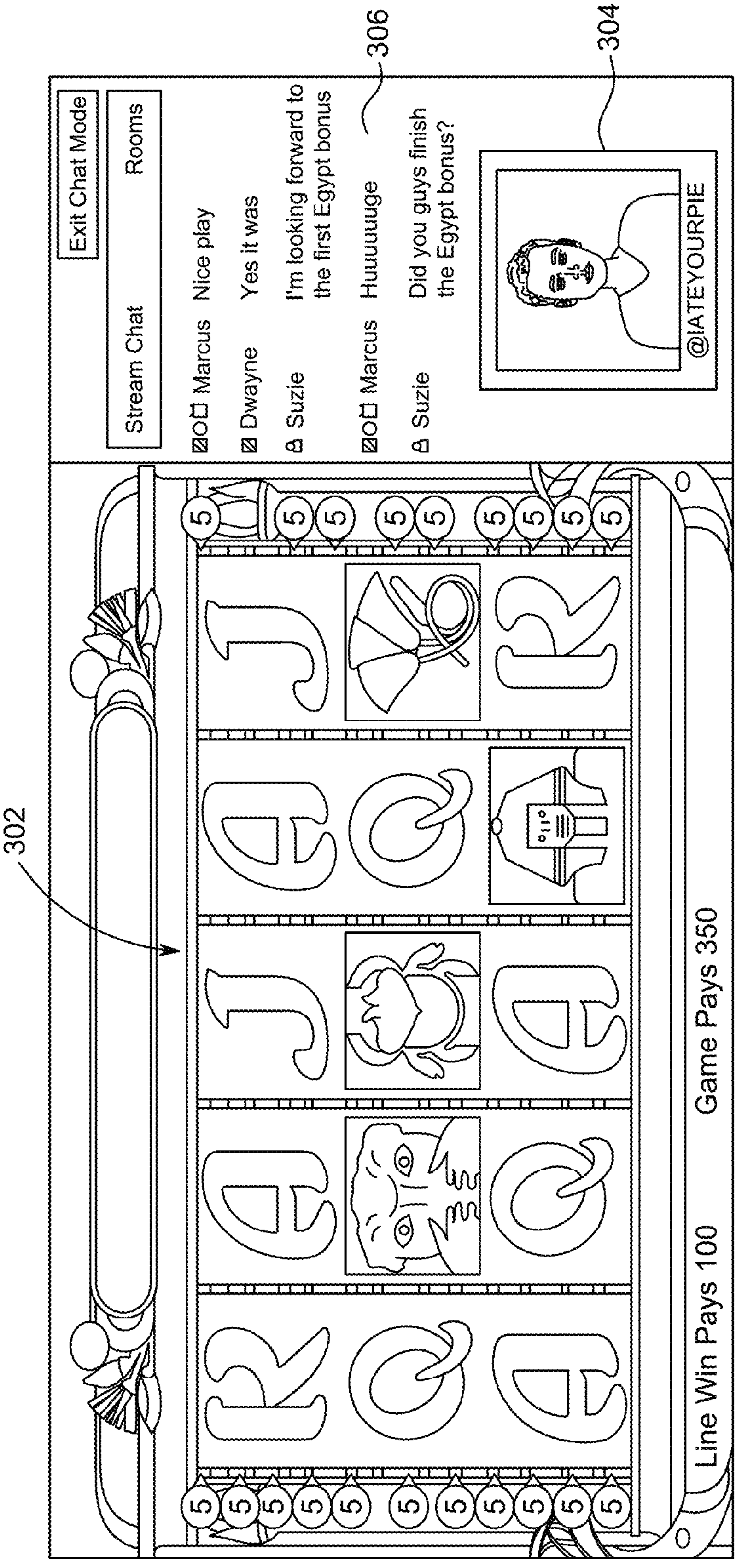
FIG. 3 is an example graphical user interface displayed to a viewer of a client device in association with a live stream of a gaming session occurring at a streaming device.

Following the upload of live streaming data, the live streaming platform enables one or more viewers at one or more client devices to access the live stream data. In certain embodiments, the live streaming platform enables viewers at the client devices to view the live stream and, in certain instances, interact with the streaming device. For example, as seen in FIG. 2, the live streaming platform 208 enables viewers at different client devices, such as a mobile client device 212*a* (e.g., a mobile client device operating with a remote game server and a remote gaming platform, that interacts with the live streaming platform, to enable, via an internet browser or application of the mobile client device to access a live stream of one or more events occurring in association with a streaming device, access one or more events occurring in association with a remote game server operating with the streaming device and/or enable one or more interactions with the streaming device), a personal client device 212*b* (e.g., a personal client device operating with a remote game server and a remote gaming platform, that interacts with the live streaming platform, to enable, via an internet browser or application of the mobile client device to access a live stream of one or more events occurring in association with a streaming device, access one or more events occurring in association with a remote game server operating with the streaming device and/or enable one or more interactions with the streaming device), and an EGM operating as a client device 212*c* to view the live stream (including, but not limited to, as seen in FIG. 3, viewing a play of an iGaming game 302 and audio/video content of the user at the streaming device 304) and, in certain instances, interacting with the streaming device (including, but not limited to, as also seen in FIG. 3, chatting with the user at the streaming device 306 in one or more chat windows or chat rooms).

In certain embodiments, the live streaming platform enables any viewer to access any live stream associated with any streaming device. In certain embodiments, the live streaming platform restricts certain viewers from accessing certain live streams associated with certain streaming devices. In certain embodiments, the system restricts access to certain live streams based on one or more of an age of the viewer, a ranking of the viewer (e.g., a player tracking status of the viewer), a location of the viewer, any invitation to participate extended to the viewer, an age of the user, a location of the user, a ranking of the user (e.g., a player tracking status of the user), any invitation to participate extended to the user, any regulations pertaining to the age and/or location of the viewer, and/or any regulations pertaining to the age and/or location of the user.

In certain embodiments which impose one or more restrictions on viewers, the system enables a viewer to pay a fee (e.g., a daily fee, weekly fee, monthly fee or yearly fee) to view one or more live streams and/or participate in one or more live chats. In one such embodiment, if the system requires a viewer to pay to fully participate in the live stream, then in addition to any percentage of the fees allocated to the operator of the live streaming platform (e.g., the component associated with the gaming establishment operator 232 of FIG. 2), the system allocates a percentage of the fee to the user at the streaming device associated with the live stream. In another such embodiment, if the system requires a viewer to pay to fully participate in the live stream, then in addition to any percentage of the fees allocated to the operator of the live streaming platform, the system additionally or alternatively allocates a percentage of the fee to the gaming establishment where the streaming device associated with the live stream is at. In this embodiment, if the live streams associated with a user occurred via the user playing multiple streaming devices at multiple gaming establishments, the system splits the fees amongst the multiple gaming establishments based on any suitable fee splitting arrangement, such as based on hours played at each streaming device and/or coin-in at each streaming device.

In certain embodiments, the live streaming platform enables one or more viewers interfacing with a client device to access the live stream without further interactions. In these embodiments, the live streaming platform enables the viewer to passively observe the events occurring at the streaming device. In certain embodiments, the live streaming platform enables one or more viewers interfacing with a client device to access the live stream and further interact with the user at the streaming device. In these embodiments, the additional information utilized to form the supplemental content includes the interactions between the different users of the different devices in the live streaming environment. For example, live streaming platform interface 214 of FIG. 2 enables one or more chats (i.e., interactions) to occur between the streaming device and zero, one or more client devices utilizing a chat component 234 of the live streaming platform 208. In these embodiments, upon an occurrence of a viewer interaction event, the live streaming platform enables the viewer to not only observe the events occurring at the streaming device but additionally interact with the user at the streaming device, such as by providing gifts to the user at the streaming device and/or participating in a conversation with the user at the streaming device. In certain embodiments, the live streaming platform enables one or more viewers interfacing with a client device to access the live stream and further interact with the live streaming platform to access certain wagering features. In these embodiments, upon an occurrence of a viewer interaction event, the live streaming platform enables the viewer to not only observe the events occurring at the streaming device from the client device but additionally interact with the live streaming platform from the client device to place one or more wagers on one or more events occurring at the streaming device which are part of the live stream.

It should be appreciated that in certain embodiments which enable one or more viewers of one or more client devices to interact with one or more live streams (e.g., via live chatting with a user at the streaming device generating at least part of the live stream and/or via wagering on one or more events associated with the streaming device generating at least part of the live stream), the live streaming platform accounts for this interaction in determining any additional information to display as part of the live stream. For example, the additional information incorporated as part of a live stream includes data associated with one or more bets placed in association with a user at a streaming device, such as the amount won by viewers for back betting on a user at a streaming device or the win and loss records for back betting sports wagers placed by viewers in association with a user at a streaming device. In such embodiments wherein one or more viewers interact with the live stream, since the streaming device is the entity that encodes the video stream, any activities or event occurring on the live streaming platform must be sent to the streaming device to update any graphical elements rendered in the video stream. For example, if a viewer sends a gift to a user at the streaming device, then the live streaming platform generates an award message. In this example, either the live streaming platform sends the generated message to the streaming device, or the streaming device actively polls the live streaming platform for any outstanding notification messages. Upon receipt of a notification message, the streaming device acts upon the notification, such as displaying a notification that only the user at the streaming device can see, rendering of one or more notifications onto the game itself, and/or rendering of one or more notifications as part of the video stream (which are viewable by viewers and may or may not be seen by the user at the streaming device).

In one embodiment wherein the viewer interfacing with a client device actively interacts with the live stream, following the viewer establishing and adequately funding a live streaming wagering account (e.g., account 224 maintained in association with the live streaming platform of FIG. 2) and/or establishing and funding an account associated with a remote gaming platform associated with the client device and accessing a live stream associated with a gaming session at a streaming device, the live streaming platform enables the viewer to place a back bet (e.g., back betting opportunities 236 offered in association with the live streaming platform of FIG. 2). Such back bets are based on the bet placed by the user at the streaming device and may be associated with a play of an iGaming game occurring at the streaming device and/or any wagerable event occurring at the streaming device that is independent of any play of any game. In this embodiment, if the user at the streaming device does not win any award based on the placed wager, then the viewer also loses the back bet. On the other hand, if the user at the streaming device wins an award (having a value greater than zero) based on the placed wager, then any viewer who was back betting along with the user at the streaming device will win the same amount. In one such embodiment, the system provides the entire win amount of the viewer to the viewer (to place another back bet or transfer to the live streaming wagering account). In another such embodiment, the system provides or otherwise automatically gifts a portion of the win amount of the viewer to the user at the streaming device.

Figure 4A:
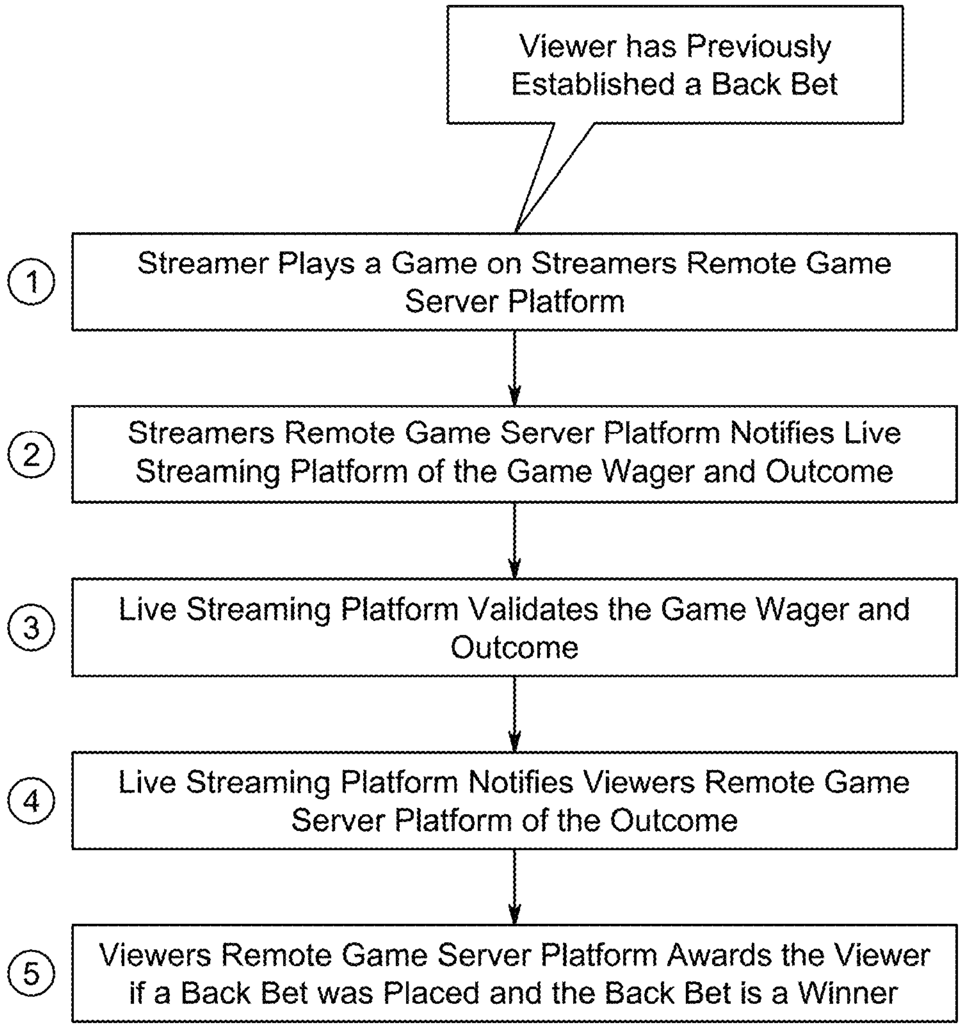
FIG. 4A is a flow chart of an example process for operating a system which includes a live streaming platform validating, for a remote game server associated with a client device, at least a game outcome from another remote game server associated with a streaming device.

In certain embodiments in which the live streaming platform enables a viewer to place a back bet, such as a wager on a play of an iGaming wagering game occurring at a streaming device, certain technical challenges arise when the remote game server operating with the streaming device differs from the remote game server operating with the client device. One such technical challenge stems from each remote game server operating with the live streaming platform may not be initially aware of the back bets that are placed by users of client devices as such information may solely be maintained by the live streaming platform. To overcome this technical challenge brought about by the disconnect between different remote game servers each interfacing with the live streaming platform, as seen in FIG. 4A, in certain embodiments, the live streaming platform operates with the remote game servers of the streaming device and the client device to receive, from the remote game server operating with the streaming device, game wagering information and/or game outcome information associated with the streaming device. In these embodiments, the live streaming platform validates the received game wagering information and/or game outcome information and notifies the remote game server operating with the client device of the game wagering information and/or the game outcome information. Such a notification enables the remote game server operating with the client device to resolve the back bet made in association with a streaming device operating with a different remote game server. For example, if a user at a client device (viewing a stream of games from a streaming device) places a back bet to match the wagers of a user at the streaming device up to $500, then the live streaming platform will record that back bet by the user of the client device. In this example, to facilitate the back betting between the streaming device operating with one remote game server and the client device operating with another remote game server, during each subsequent game cycle by the streaming device, the live streaming platform learns about the wager placed by the user of the streaming device and coordinates with the appropriate remote game servers that service the market or jurisdiction of the back betting user of the client device to record the back bet for that user as well as any win resulting from the back bet.

Figure 4B:
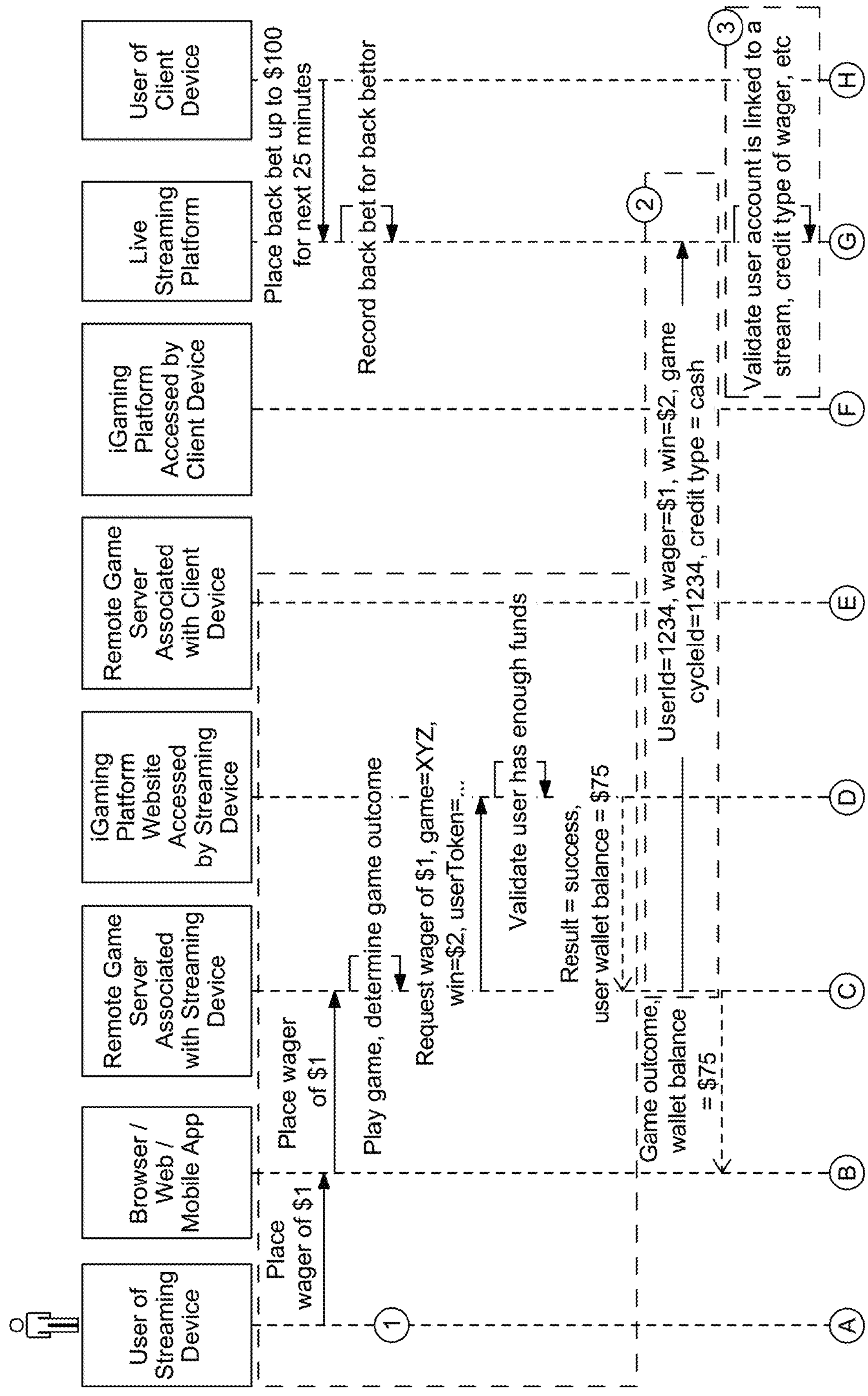
FIG. 4B is a flow chart of an example process for operating a system which includes a live streaming platform orchestrating the handling of a wager placed from a client device associated with a remote game server on a play of a game occurring at a streaming device associated with another remote game server.
Figure 4B:
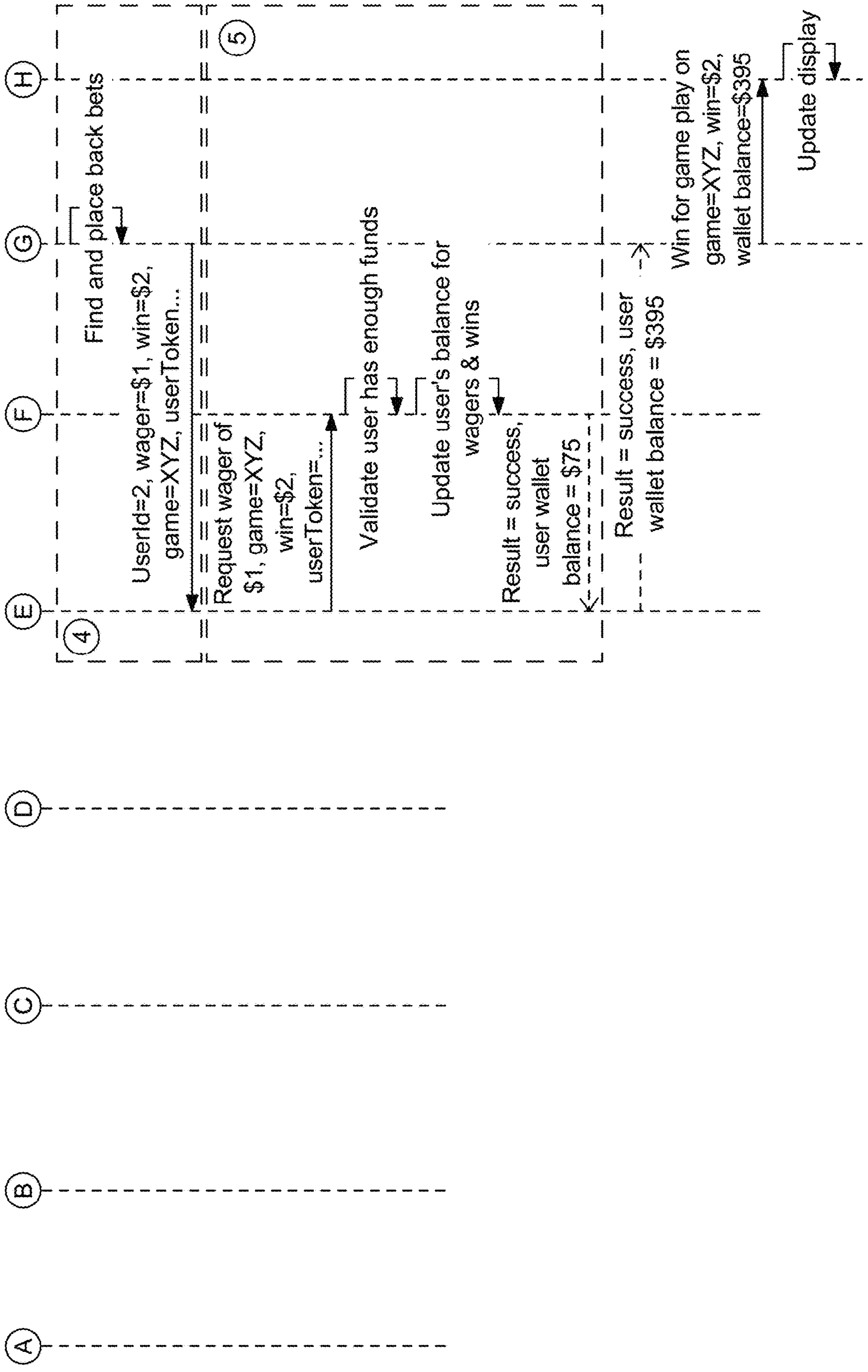

More specifically, in certain embodiments, as seen in FIG. 4B (which illustrates certain interactions between the streaming device, the remote game server operating with the streaming device, the remote gaming platform operating with the remote game server for the streaming device, the client device, the remote game server operating with the client device, the remote gaming platform operating with the remote game server for the client device and the live streaming platform), in association with a play of a wagering game occurring at a streaming device accessed via a web browser or a mobile device application of the streaming device, in addition to a remote game server operating with the streaming device interfacing with a remote gaming platform associated with the streaming device (i.e., the iGaming platform accessed by the streaming device) to ensure that one or more accounts maintained for the user of the streaming device has adequate funds to place a requested wager, the remote game server operating with the streaming device notifies the live streaming platform of certain data, such as, but not limited to, when a game starts, when a wager is placed, an amount of the wager, an outcome of the game, when an amount is won, the amount won and when a game ends. In these embodiments, the live streaming platform then proceeds with notifying the remote game server operating with the client device of such data originating from the remote game server operating with the streaming device.

In certain embodiments, following the live streaming platform notifying a remote game server associated with a client device of one or more events occurring in association with a remote game server associated with the streaming device, as further seen in FIG. 4B, the remote game server associated with the client device operates with a remote gaming platform associated with the client device (i.e., the iGaming platform accessed by the client device) to withdraw funds from an account associated with the user of the client device to pay for the back bet placed and, if necessary, deposit funds to the account associated with the user of the client device based on awards won from such back bets placed (without requiring any specific information regarding the paytable of the streaming device and/or any paytable of the client device). That is, assuming that the back bet mirrors (in type and amount) the wager placed at the streaming device, the user at the streaming device does not win any award based on the placed wager at the streaming device, then the live streaming platform (and/or the remote game server operating with the client device and/or the remote gaming platform associated with the client device) determines that the viewer at the client device also loses the back bet. Conversely, if the user at the streaming device wins an award (having a value greater than zero) based on the placed wager at the streaming device (and assuming that the amount of the back bet is the same as the wager placed at the streaming device and that the live streaming platform credits the account of the user of the client device with the matching amount of the win occurring at the streaming device), then the live streaming platform (and/or the remote game server operating with the client device and/or the remote gaming platform associated with the client device) determines that the viewer at the client device who placed a back bet (of the same amount as the wager placed at the streaming device) will win an award of the same amount. For example, if the user of the streaming device wagered $1.00 and won $2.00, then if the user of the client device wagered $1.00, the live streaming platform (and/or the remote game server operating with the client device and/or the remote gaming platform associated with the client device) determines, independent of any paytable information, that the user of the client device also wins $2.00. Likewise, if the user of the streaming device wagered $1.00 and lost (i.e., won $0.00), then the live streaming platform (and/or the remote game server operating with the client device and/or the remote gaming platform associated with the client device) determines, independent of any paytable information, that the user of the client device also loses their $1.00 wagered. It should be appreciated that such a configuration further enables scaling of the wager amount and the win amount without requiring any specific information regarding the paytable of the streaming device. For example, if the user of the streaming device wagered $1.00 and won $5.00 and if the user of the client device wagered $0.50 (i.e., half of the $1.00 wagered at the streaming device), then the live streaming platform (and/or the remote game server operating with the client device and/or the remote gaming platform associated with the client device) determines that the user of the client device wins $2.50 (half of the $5.00 won at the streaming device).

In certain embodiments in which the live streaming platform enables the viewer to place a back bet, such as a wager on a play of a wagering game occurring at a streaming device, the system enables session based wagering in which a client device commits to placing a series of wagers in association with a series of streamed games to be played at the streaming device. In these embodiments, the user of the streaming device creates a session including a predefined quantity of games to be played at the streaming device and/or including an intention of an amount of time spent playing games at the streaming device. A session may be available to each of the client devices, a grouping of eligible client devices or an individual client device. Following the creation of the session, the user of a client device commits, subject to having an amount of funds in one or more accounts associated with the user of the client device, to placing wagers on each of the games of the created session or a subset of the games of the created session. Once committed to place wagers, the system operates to automatically place such committed wagers, thereby eliminating certain of the delays otherwise associated with a user of a client device manually placing a wager on a play of a game at a streaming device. For example, to address certain of the concerns of wagering on each individual game, a user of a client device places a $100 wager on a session that results in a $1 wagered on the next 100 plays of the game at the streaming device. In another example, a user of a client device places a $100 wager on a session that results in matching the wagers placed by the user of streaming device (until the $100 is depleted). Such a configuration of committing to placing multiple wagers at a single point in time and enabling the system to automatically place such wagers over an ensuing period of time enables the system of the present disclosure to synchronize the placement of such wagers to minimize certain of the timing challenges associated with wagering in a streaming environment caused by certain delays in streaming content between a streaming device, a live streaming platform, one or more client devices and one or more remote game servers.

In another embodiment wherein the viewer interfacing with a client device actively interacts with the live stream, following the viewer establishing and adequately funding a live streaming wagering account (and/or accessing an account associated with a remote gaming platform associated with the client device) and accessing a live stream associated with a gaming session at a streaming device, the live streaming platform (and/or the remote game server operating with the client device and/or the remote gaming platform associated with the client device) enables the viewer at the client device to place a bet on a play of a game or other event occurring at the streaming device independent of any bet placed by the user at the streaming device. In this embodiment, the system enables a wager to be placed by the viewer at the client device on any suitable event that may or may not occur in association with one or more plays of one or more games at the streaming device and/or independent of any such plays at the streaming device. That is, the live streaming platform (and/or the remote game server operating with the client device and/or the remote gaming platform associated with the client device) enables the viewer at the client device to wager on different events occurring in association with the streaming device, such as, but not limited to, the type of wins occurring at the streaming device, the amount of wins/losses occurring at the streaming device, any changing in a credit meter of the streaming device, any bonus being hit or other game event to be trigger at the streaming device including the number of times the event happened. For example, the live streaming platform (and/or the remote game server operating with the client device and/or the remote gaming platform associated with the client device) enables the viewer at the client device to place a wager that a three diamond wining symbol combination will occur in the next five games played at the streaming device, during a session of gaming at the streaming device, over a period of time (e.g., two minutes) of gaming at the streaming device, and/or during a time window (e.g. 4:04 pm until 4:07 pm) of gaming at the streaming device. In different embodiments, the system provides the entire win amount of any winning wager of the viewer to the viewer (to place another bet or transfer to the live streaming wagering account) or the system provides a portion of the win amount of any winning wager to the viewer to the viewer, such as by automatically gifting a portion of the win amount of the viewer to the user at the streaming device.

In another embodiment wherein the viewer interfacing with a client device actively interacts with the live stream, following the viewer establishing and adequately funding a live streaming wagering account (and/or accessing an account associated with a remote gaming platform associated with the client device) and accessing a live stream associated with a gaming session at a streaming device, the live streaming platform (and/or the remote game server operating with the client device and/or the remote gaming platform associated with the client device) enables the viewer to place a bet against one or more other viewers (and/or one or more users at one or more streaming devices). For example, the system enables a viewer to place a bet on which user will win an ongoing tournament. In this embodiment, if the wagered-on user does not win the ongoing tournament, then the viewer loses their wager. On the other hand, if the wagered-on user wins the ongoing tournament, then the system provides the viewer an award based on the lost wagers placed by one or more other viewer (and/or one or more users at one or more streaming devices) minus a percentage held by the system.

In different embodiments, the system of the present disclosure is configured to enable the play of any suitable game, such as a wagering game, a non-wagering casual game, and/or a non-wagering social game, occurring at a streaming device to be streamed to one or more viewers at one or more client devices. In certain embodiments, the game comprises a play of a primary game, such as a primary wagering game, wherein the game triggering event includes the placement of a wager on the play of the primary game. In certain embodiments, the game comprises a play of a secondary game, such as a free spin game, wherein the game triggering event occurs based on a displayed event associated with a play of a wagered on primary game. In certain embodiments wherein the game comprises a secondary game, such as a free spin game, the game triggering event occurs based on an event independent of any displayed event associated with the play of the wagered on primary game. In various embodiments, the displayed play of the wagering game, the non-wagering casual game, and/or the non-wagering social game includes, but is not limited to: a play of any suitable spinning reels game, a play of any suitable wheel game; a play of any suitable card game such as blackjack, poker or baccarat; a play of any suitable keno game; a play of any suitable bingo game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable partial skill game; a play of any suitable auction game; a play of any suitable reverse-auction game; a play of any suitable group game; and/or a play of any other game of the present disclosure. In certain embodiments, the awards available to be won by one or more viewers of one or more client devices in association with one or more wagers placed by such viewers of such client devices (as well as the awards available to the user of the streaming device) include, but are not limited to, one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the system, virtual goods not associated with the system, an access code usable to unlock content on an internet.

It should be appreciated that while employing the live streaming platform to coordinate with the appropriate remote game servers that service the market or jurisdiction of a streaming device and one or more client devices which are placing wagers on the streamed games occurring at the streaming device overcomes the technical challenge presented by these remote game servers otherwise operating separate and distinct from each other, certain security risks arise with the employment of the live streaming platform to coordinate game wagering and game outcome data from different remote game servers. For example, certain instances may occur in which the live streaming platform places a back bet for a user of a client device that never placed such a back bet.

In certain embodiments, in view of certain potential security risks, such as the risk of the live streaming platform placing a back bet for a user of a client device that never placed such a back bet, the system employs one or more security tokens to authenticate one or more back bets placed by one or more users of client devices. In these embodiments, the utilization of one or more security tokens operate to validate zero, one or more requests originating from the client device in association with the streaming of one or more games to the client device, such as placing one or more back bets from the client device and/or undertaking other activities (or inactivity) from the client device that requires security based on the live streaming platform operating at the intersection of multiple independently operating remote game servers.

Figure 5A:
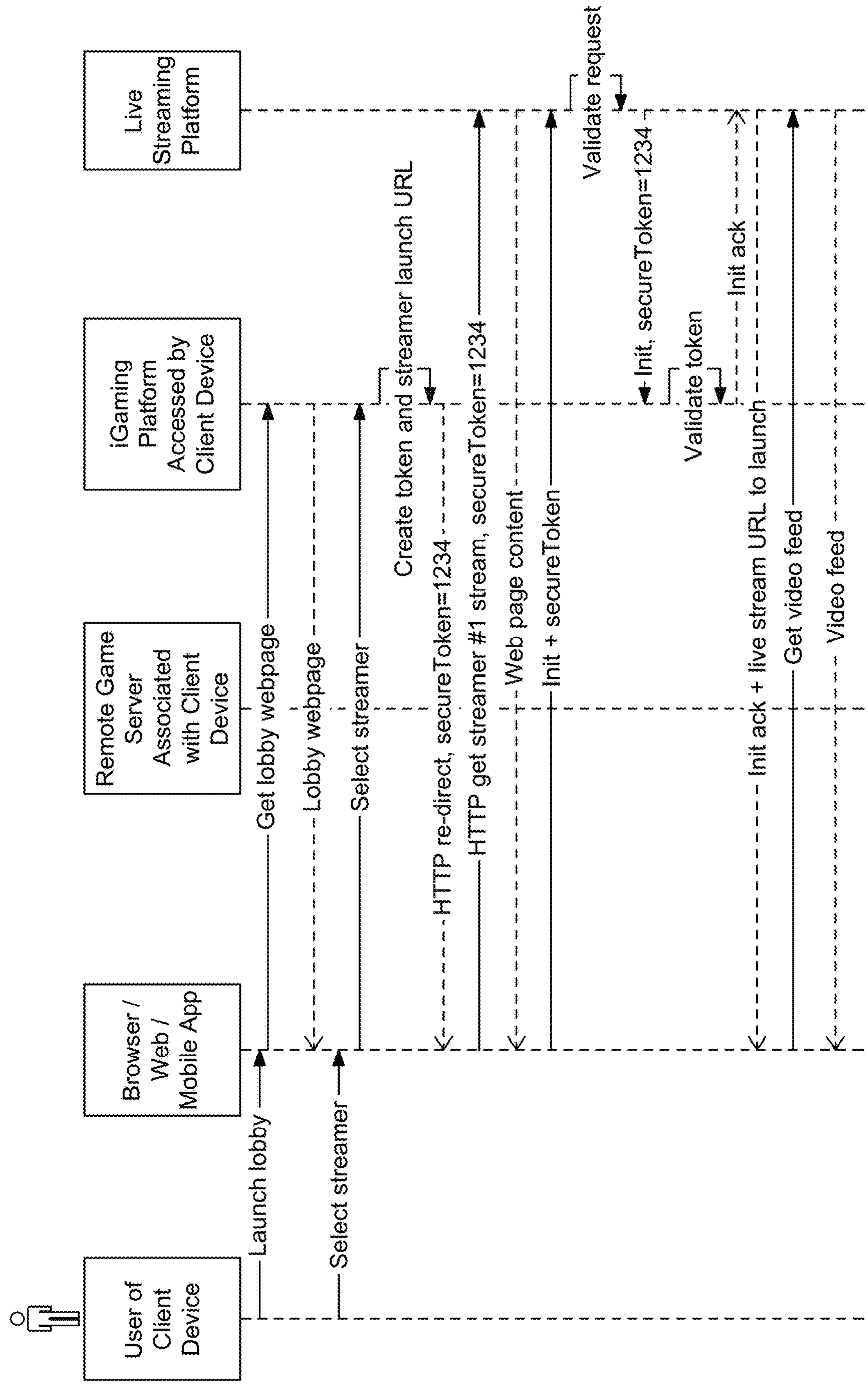
FIG. 5A is a flow chart of an example process for operating a system which includes a live streaming platform utilizing a security token to validate a client device associated with a remote game server.

In certain embodiments, when a user at a client device launches a streaming session of games occurring at a streaming device, the remote gaming platform associated with the remote game server operating with the client device generates a security token. Such a security token must then be validated by the viewer's iGaming website being accessed by the client device during launch of the live stream to validate the security of the streaming session. Additionally, such a security token is usable to create subsequent remote game server tokens, which can be used for one or more back-betting sessions with the remote game server that the streaming device is operating with to place wagers on. In operation of this embodiment, when the user of a client device makes one or more inputs to place a back bet, such as a wager on a play of an iGaming game occurring at a streaming device, one or more of the live streaming platform, the remote game server operating with the client device and/or the remote gaming platform associated with the client device use the security token in association with the placement of the back bet on behalf of the user of the client device. In certain instances, the client device and/or the remote game server associated with the client device use the security token during communications with the remote gaming platform associated with the client device to validate the placement of one or more wagers and the deposit of amounts from any wins. For example, as seen in FIG. 5A (which illustrates certain interactions between the client device, the remote game server operating with the client device, the remote gaming platform operating with the remote game server and the live streaming platform), following a user of the client device selecting a stream from a streaming device to view, the remote gaming platform associated with the client device creates a security token which is then utilized by at least the live streaming platform and the client device to validate actions undertaken by the user of the client device in relation to the launched streaming session.

Figure 5B:
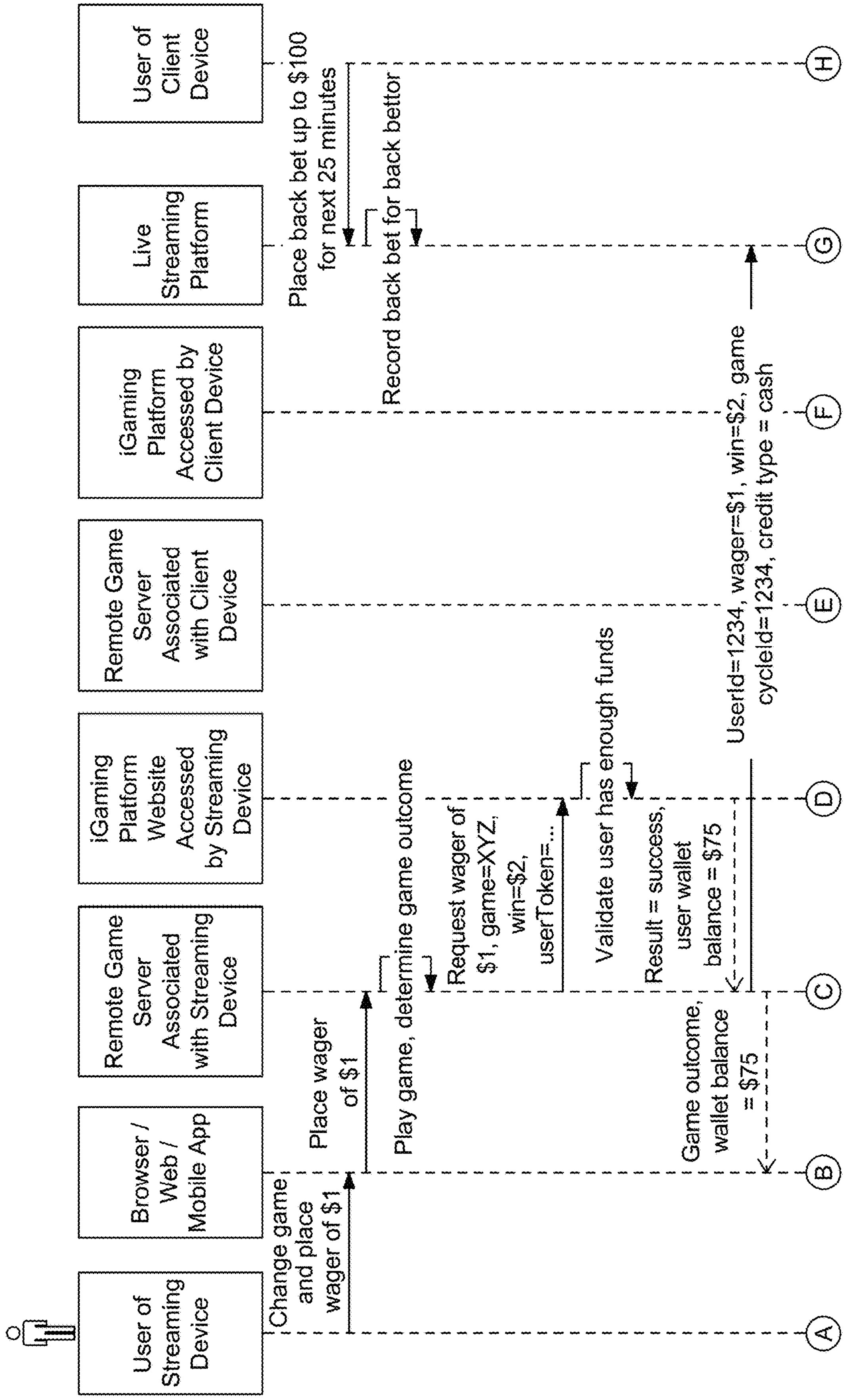
FIG. 5B is a flow chart of an example process for operating a system which includes a live streaming platform utilizing a security token in the orchestration of the handling of a wager placed from a client device associated with a remote game server on a play of a game occurring at a streaming device associated with another remote game server.
Figure 5B:
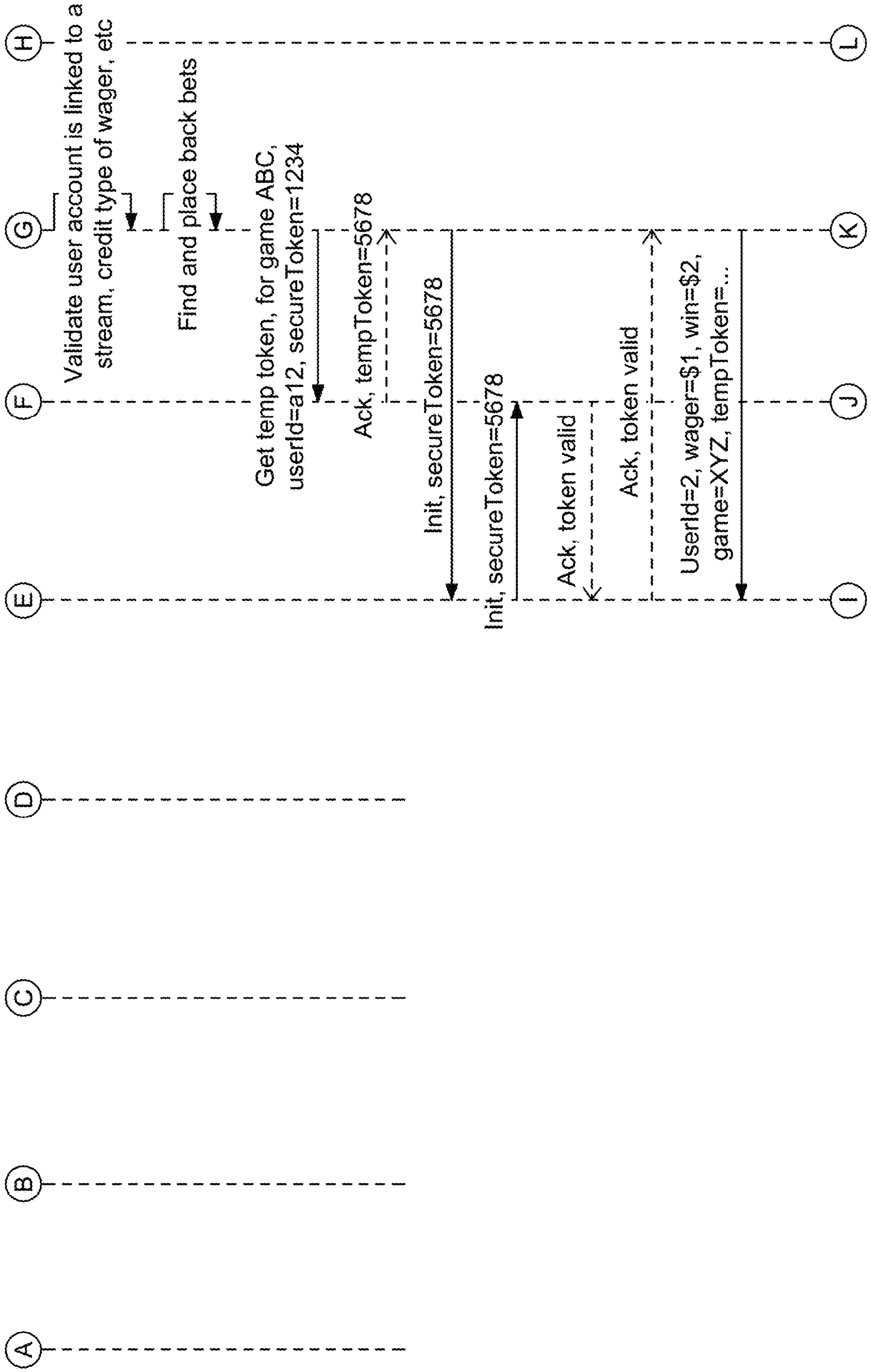
Figure 5B:
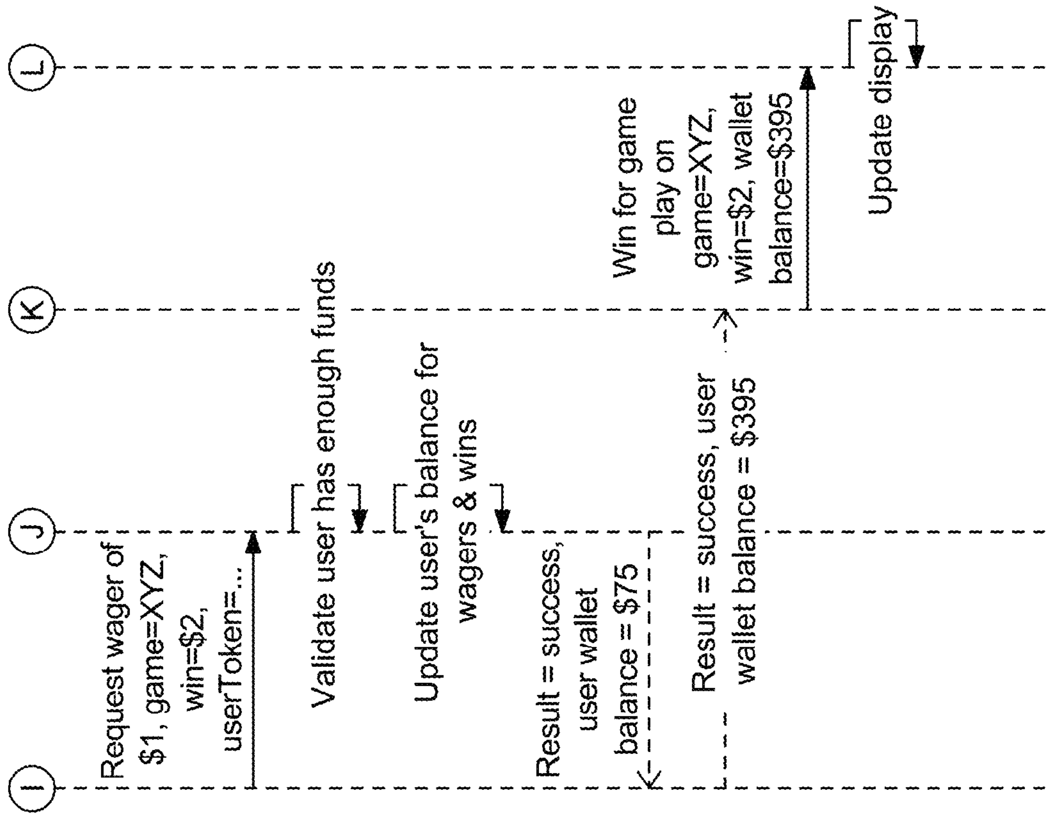

In another embodiment which utilizes security tokens to authenticate actions undertaken at a client device operating with one remote game server that pertain to events and/or content streamed from a streaming device operating with another remote game server, the live streaming platform creates a new temporary security token for a back-betting session for a given game with the remote game server associated with the game currently being played by the streaming device. For example, as seen in FIG. 5B (which introduces temporary security tokens to the above-described illustrated interactions of FIG. 4B between the streaming device, the remote game server operating with the streaming device, the remote gaming platform operating with the remote game server for the streaming device, the client device, the remote game server operating with the client device, the remote gaming platform operating with the remote game server for the client device and the live streaming platform), following a user of the client device selecting a back bet to be placed in association with the live stream and the live streaming platform recording such a back bet and following the user of the streaming device placing a wager on the game to be streamed, the live streaming platform creates a temporary security token. In this example, the live streaming platform then operates with the remote game server operating with the client device and the remote gaming platform operating with that remote game server to validate the temporary security token, place the back bet and resolve the placed back bet based on the results of the game outcome from the streaming device. It should be appreciated that in this embodiment, such a security code is temporary at least because it would need to be re-established for each client device engaged in back betting on the content of the streaming device whenever the streaming device changes the game being played, such as triggered by a streaming device game change event detected by the live streaming platform. Additionally, while illustrated as the temporary security token being established when a wager is placed via the streaming device that the user of the client device has attempted to place a back bet on, the temporary security token can additionally or alternatively be established responsive to other events, such as when a user of the streaming device selects a game to stream (but has not yet placed a wager on that selected game).

As mentioned above, while employing the live streaming platform to coordinate with the appropriate remote game servers that service the market or jurisdiction of a streaming device and one or more client devices which are placing wagers on the streamed games occurring at the streaming device overcomes the technical challenge presented by these remote game servers otherwise operating separate and distinct from each other, another security risk that arises with the employment of the live streaming platform to coordinate game wagering and game outcome data from different remote game servers relates to certain individuals attempting to compromise the data communicated between the live streaming platform and one or more remote game servers. For example, based on certain considerations such as the acts of certain nefarious individuals looking to take advantage of the additional data communicated via the live streaming platform and interfere with and/or manipulate such data to their gain, left unchecked, certain instances may occur in which the live streaming platform forwards a game outcome from another remote game server that is incorrect or invalid.

In certain embodiments, to alleviate (or eliminate) the security concerns that arise when data associated with a game outcome is directly communicated to a remote game server (which represents a risk that such data be misused to generate funds for a bad actor), the system of the present disclosure operates to validate the data associated with the game outcome to ensure that such data is authentic. In one such embodiment, the game outcome generated by a remote game server operating with a streaming device contains one or more fields that include a signature generated by the source remote game server. In this embodiment, in association with this outcome payload being communicated to one or more remote game servers operating with one or more client devices for back-betting purposes, each receiving remote game server separately validates the signature of the game outcome to ensure the game outcome is authentic.

Figure 5C:
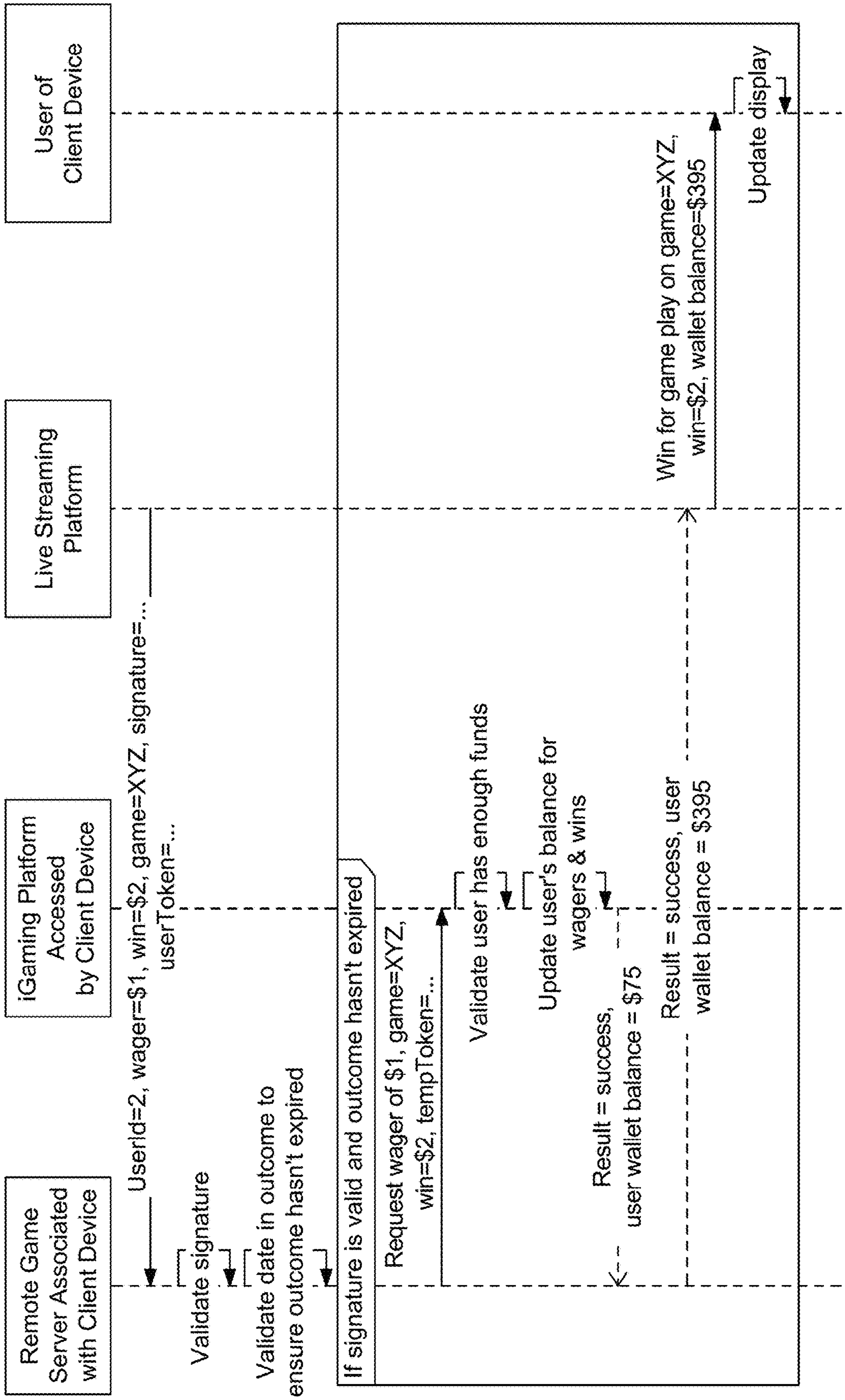
FIG. 5C is a flow chart of an example process for operating a system which includes a live streaming platform operating with a remote game server and an iGaming platform to validate a game outcome from a play of a game occurring at a streaming device associated with another remote game server.

In another such embodiment (and in view of the secondary risk that even with signatures associated with game outcomes, a bad actor could still farm a collection of historic game outcomes from infrastructure-level components and attempt a replay attack days after the game outcomes were originally generated), the system requires that each game outcome message include a timestamp. In this embodiment, the system employs certain operational parameters based on such timestamps, such as each remote game server operating with a client device that receives a game outcome can only accept as valid game outcomes messages that occurred within a predetermined interval (e.g., within the last ten seconds) and must reject older game outcomes that fall outside this interval. For example, as seen in FIG. 5C (which illustrates certain interactions between the remote game server operating with a client device, the remote gaming platform operating with the remote game server, the live streaming platform and the client device), the game outcome (sourced from a remote game server associated with a streaming device) received by the remote game server includes one or more signatures that need to be validated and confirmed as active (i.e., not yet expired) for the remote game server to operate with the remote gaming platform, the live streaming platform and the client device to process the back bet placed and resolve the placed back bet based on the results of the authenticated game outcome from the streaming device.

Figure 6A:
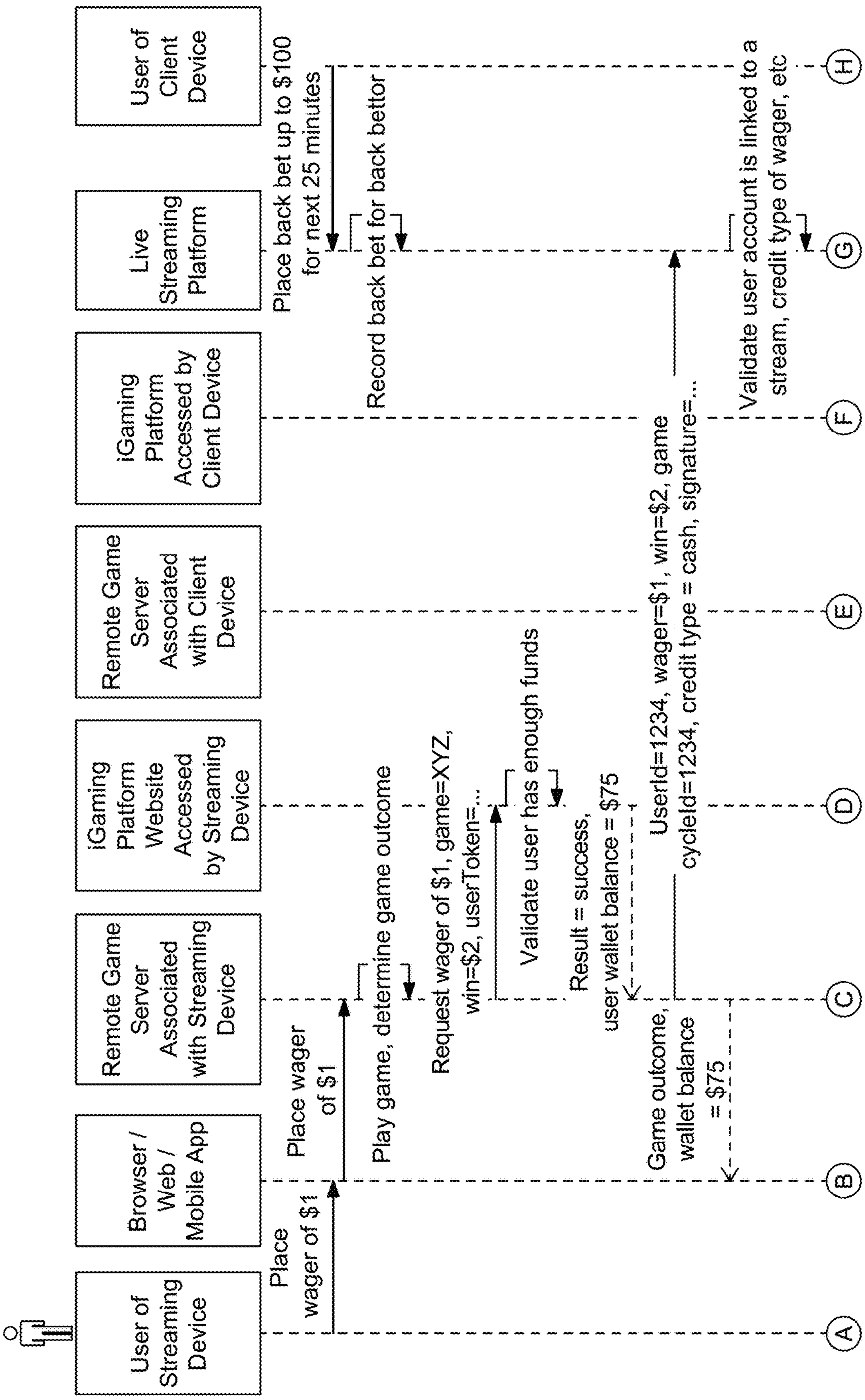
FIG. 6A is a flow chart of an example process for operating a system which includes a remote game server associated with a streaming device directly distributing at least game outcome information from a play of a game occurring at the streaming device to another remote game server associated with a client device.
Figure 6A:
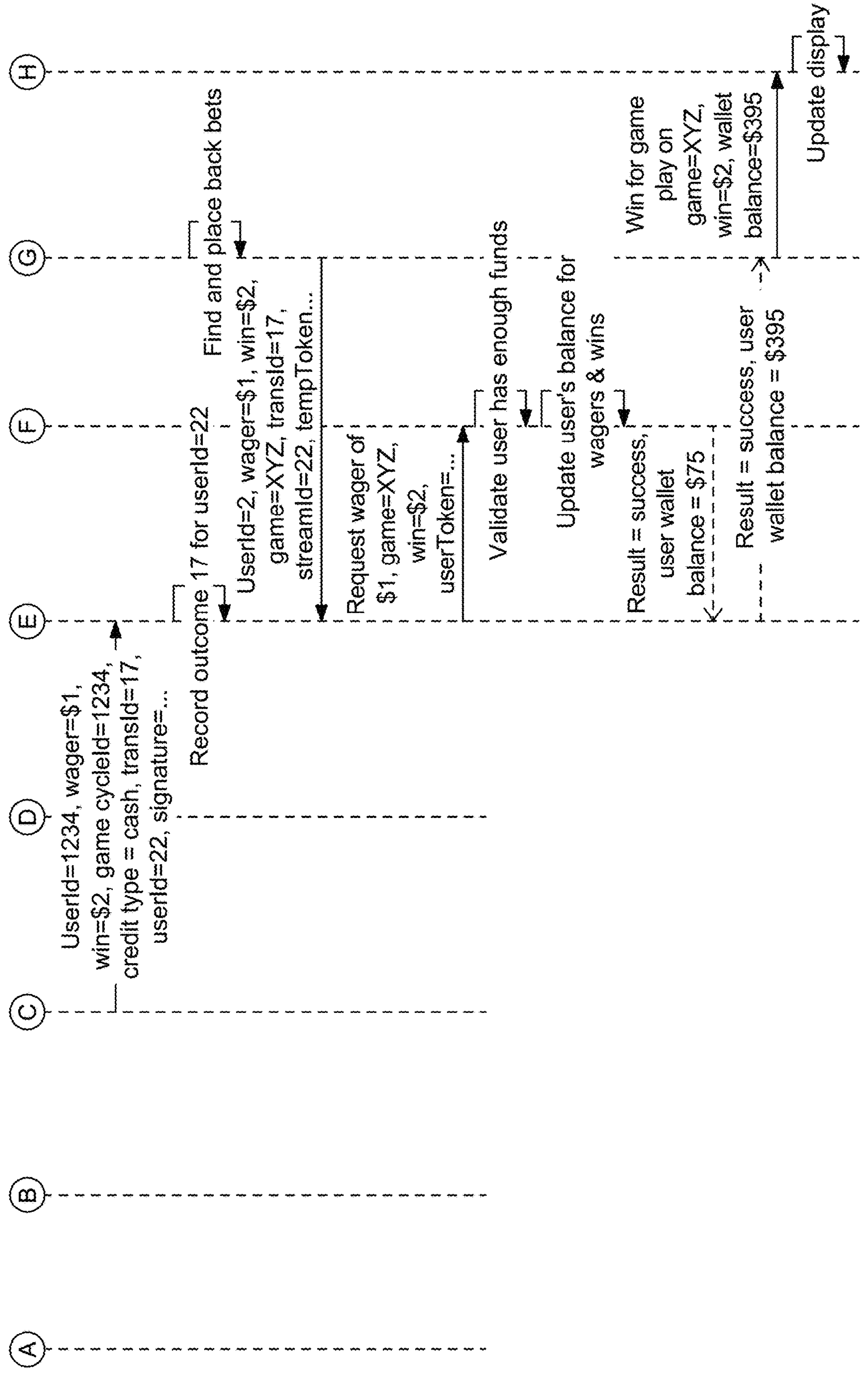

As mentioned above, while employing the live streaming platform to coordinate with the appropriate remote game servers that service the market or jurisdiction of a streaming device and one or more client devices which are placing wagers on the streamed games occurring at the streaming device overcomes the technical challenge presented by these remote game servers otherwise operating separate and distinct from each other, another security risk that arises with the employment of the live streaming platform to coordinate game wagering and game outcome data from different remote game servers relates to the potential for an application programming interface ("API") which support this orchestration model being misused and leveraged to inject incorrect or malicious game outcomes. Accordingly, in certain embodiments, to overcome this additional security concern, game outcomes published by the remote game server associated with a streaming device includes a unique identifier, such as a transaction identifier, a transaction identifier coupled with an environment identifier and/or a transaction identifier coupled with an operator identifier. In these embodiments, each remote game server leverages one or more private APIs to distribute game outcomes associated with client devices directly to other remote game servers. Such a configuration provides that the distribution of game outcomes from one remote game server to another remote game server is not dependent on the live streaming platform (and thus less vulnerable to attacks from another entry point). That is, while the live streaming platform is aware of the game outcomes (and may reference the game outcomes when requesting a remote game server associated with the client device to record the back bet placed by the client device), the live streaming platform is not otherwise directly involved in the distribution of game outcomes between remote game servers. For example, as illustrated in FIG. 6A (which illustrates interactions between the streaming device, the remote game server operating with the streaming device, the remote gaming platform operating with the remote game server for the streaming device, the client device, the remote game server operating with the client device, the remote gaming platform operating with the remote game server for the client device and the live streaming platform), following a user of the client device selecting a back bet to be placed in association with the live stream and the live streaming platform recording such a back bet and following the user of the streaming device placing a wager on the game to be streamed, the remote game server operating with the streaming device directly distributes at least wager information and/or the game outcome information associated with the streaming device (and including a unique identifier) to the remote game server operating with the client device. Following this direction communication of such data, the remote game server operating with the client device proceeds to operate with the remote gaming platform for the client device to place the back bet, resolve the placed back bet (based on the results of the game outcome distributed by the remote game server operating with the streaming device) and update the live streaming platform of such occurrences.

Figure 6B:
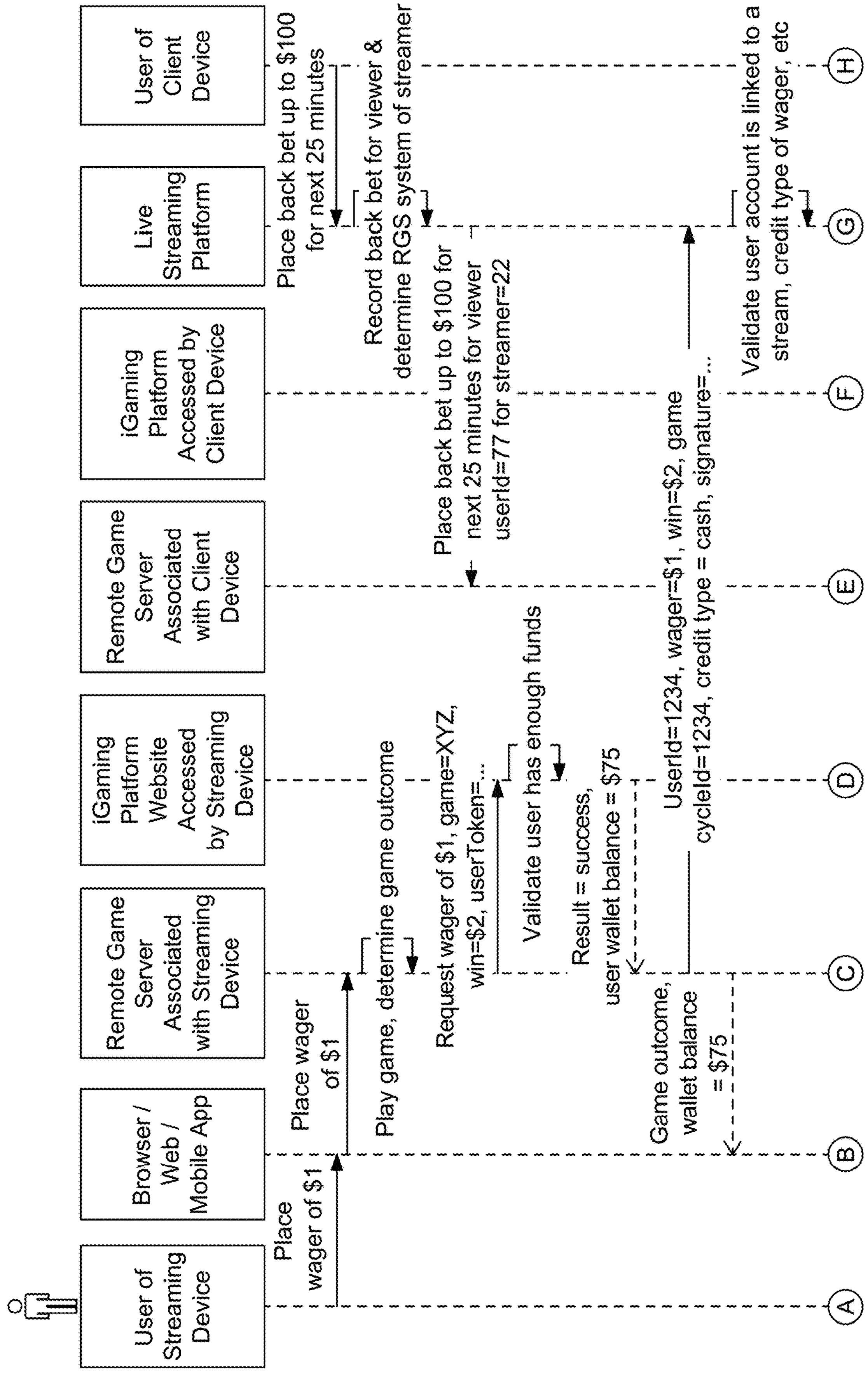
FIG. 6B is a flow chart of an example process for operating a system which includes a remote game server associated with a streaming device directly distributing at least game outcome information from a play of a game occurring at the streaming device to another remote game server associated with a client device, and further includes a live streaming platform forwarding wager information to the remote game server associated with the client device.
Figure 6B:
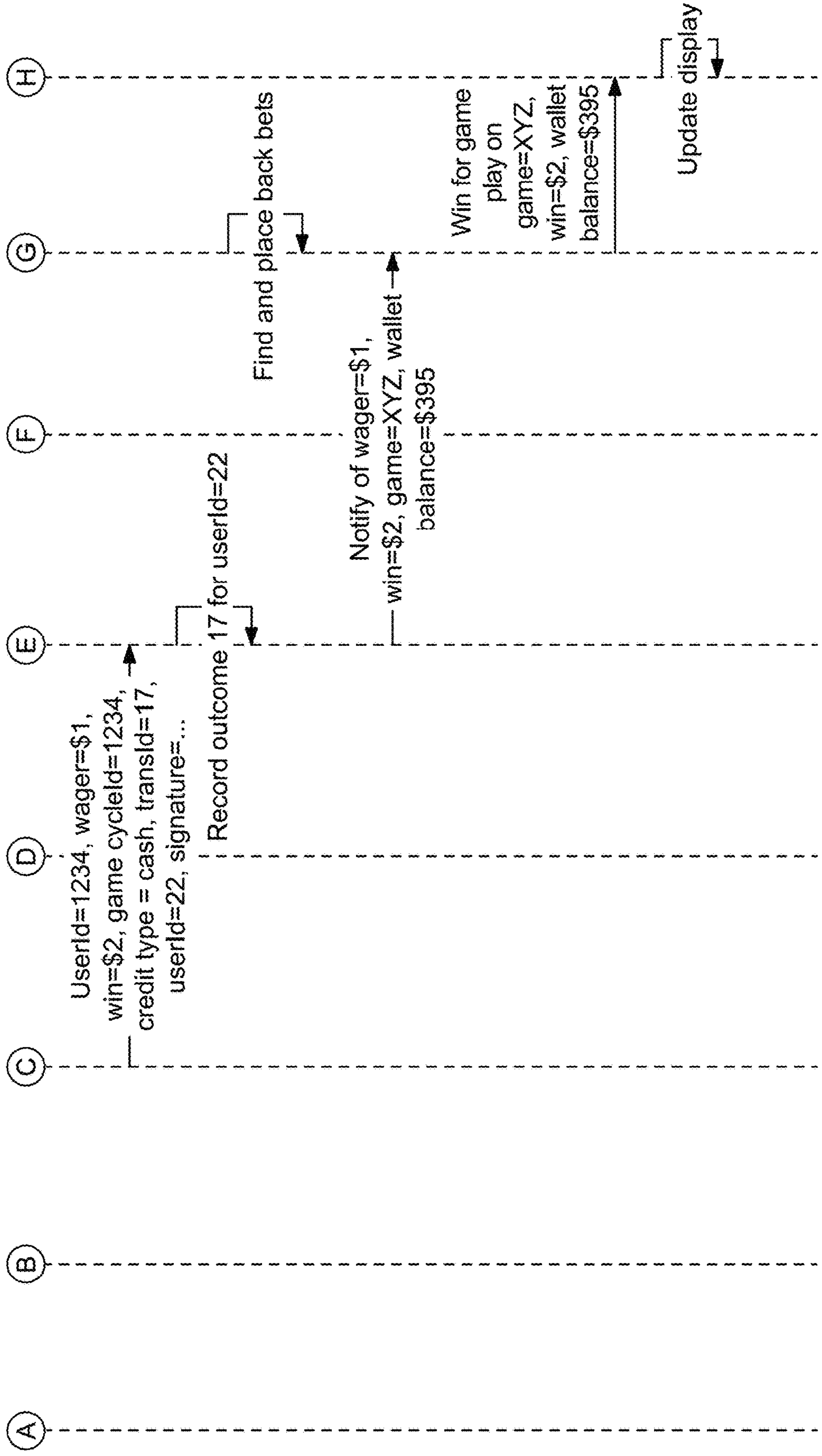

In another such embodiment, in addition to the remote game server associated with the streaming device operating directly with the remote game server associated with the client device, the live streaming platform forwards back-bet information to each remote game server associated with each client device to enables such remote game servers to manage back-bets as appropriate. For example, as illustrated in FIG. 6B (which illustrates interactions between the streaming device, the remote game server operating with the streaming device, the remote gaming platform operating with the remote game server for the streaming device, the client device, the remote game server operating with the client device, the remote gaming platform operating with the remote game server for the client device and the live streaming platform), following a user of the client device selecting a back bet to be placed in association with the live stream and the live streaming platform recording such a back bet, the live streaming platform determines the remote game server of the streaming devices and forwards information regarding the back bet to the remote game server operating with the client device. In this example, the remote game server operating with the streaming device then operates to directly distribute at least wager information and/or the game outcome information associated with the streaming device (and including a unique identifier) to the remote game server operating with the client device. Following this direction communication of such data, the remote game server operating with the client device proceeds to operate with the live streaming platform to place the back bet and resolve the placed back bet (based on the results of the game outcome distributed by the remote game server operating with the streaming device).

Accordingly, in various embodiments, in view of current limitations of live streaming environments across multiple remote game servers and security concerns that arise in communicating game outcomes across these multiple remote game servers, the system operates to coordinate operations between different remote game servers in different jurisdictions (that each permit iGaming) to expand the connection between users of the streaming devices in these different jurisdictions and/or users of the client devices in these different jurisdictions. In these embodiments, the system accounts for various security concerns/data protection concerns associated with connecting different remote game servers in removing the barriers between different live streaming environments and thus drastically improves the options of users of client devices in relation to at least placing wagers on streamed games from streaming devices connected to a remote game server separate from the remote game server connected to the client device. Such a configuration supplies users of streaming devices to a community of users of client devices spread across many jurisdictions operating with many remote game servers while securely removing certain roadblocks from preventing users of such streaming devices from streaming on the live streaming platform.

In certain embodiments, in addition to employing various security measures (e.g., signing game outcomes and/or preventing replays of game outcomes with expired timestamps) to combat the risk associated with adding an API to remote game server systems to enable game outcomes to be broadcast or published by one remote game server associated with the streaming device to other remote game servers associated with client devices where users are placing backbets, the system employs additional periodic audits of game outcomes to further mitigate risks of abuse by malicious actors or insiders to deposit malicious funds into their accounts (and/or that of accomplices). In different embodiments, when an audit and reconciliation triggering event occurs, the system audits certain data associated with the remote game server associated with the streaming device relative to corresponding data associated with the remote game servers associated with client devices. In certain embodiments, the audit and reconciliation triggering event automatically occurs at a periodic interval (e.g., daily or weekly). In certain embodiments, the audit and reconciliation triggering event occurs based on or more inputs received (e.g., an audit input made by a gaming establishment operator, made by an operator associated with any of the remote game servers, and/or made by an administrative user of the live streaming platform).

In certain embodiments, the audit relates to game outcomes published by the remote game server associated with the streaming device against the game outcomes distributed by the remote game servers associated with client devices to ensure that such game outcomes match and/or additional information associated with such game outcomes (e.g., transaction identification numbers, transaction amounts and/or relative timestamps) match. In certain embodiments, the audit additionally or alternatively relates to the wagering activity recorded by each remote game server relative to the wagering activity recorded by the live streaming platform to ensure that records of such wagering activity (and particularly the back betting activity facilitated by the live streaming platform) match.

As such, in certain embodiments during a first period of time prior to an occurrence of an audit and reconciliation triggering event, the system causes first data associated with a first game outcome determined by a first remote game server in association with a play of a wagering game displayed by a streaming device to be communicated to a second remote game server, and further causes second data associated with a second game outcome determined by the second remote game server to be communicated to a client device in association with a streamed play of the wagering game displayed by the client device. In these embodiments, responsive to an occurrence of the audit and reconciliation triggering event, the system determines if the first game outcome corresponds to the second game outcome.

In certain embodiments, in addition to recording the results of the audit, the system alerts one or more systems of any inconsistencies in the audited data such that zero, one or more corrective actions can be undertaken (e.g., notify personnel associated with the live streaming platform and/or flag an account of a user suspected in being involved in nefarious activities). In these embodiments, the system generates an audit report including any inconsistencies between the reported game outcome information and/or the reported wagering information of the different remote game servers operating with the live streaming platform.

In certain additional or alternative embodiments in which the streaming device and the client device are associated with different remote game servers, the employment of these different remote game servers requires heightened coordination relative to instances when the streaming device and the client device are associated with the same remote game server (or not associated with any remote game servers). In one such embodiment, since different remote game servers may offer different games to play, the system operates to screen certain content from being streamed such that a user of a client device is unable to view (and/or is able to view but unable to back bet on) a play of a game not available from the remote game server of the client device.

In certain additional embodiments in which the employment of different remote game servers results in the system needing to intervene to account for such differences relates to tracking users of client devices based on certain parameters. In these embodiments, the live streaming platform segregates users of client devices into groups based upon various parameters. For example, one set of users of client devices could be all viewers streaming plays of games in association with a first remote game server and another set of users of client device may be all of those streaming plays of games in association with a second remote game server. In such embodiments, the system leverages these groups to offer additional features during the live stream, such as tracking which groups back bet the most, tip the most, donate the most to a charitable cause of the streamer, and/or applause the most. Such a configuration enables the user of the streaming device to create a healthy competition amongst the viewership during a live stream. It should be appreciated while described as using remote game server association to segregate users of client devices, sets of users of client devices may be formed using other suitable differentiating factors, such as association with an operator, location (i.e., jurisdiction), and/or historic back betting activity.

In certain additional embodiments in which the employment of different remote game servers results in the system needing to intervene to account for such differences relates to how to handle one or more benefits owed to the user of the streaming device by one or more operators, such as one or more online casinos. In certain such embodiments in which a user of a streaming device receives a benefit from the system for providing content to be streamed, the system accounts for the different remote game servers accessing the streamed content in determining the benefit to the streamer. In these embodiments, the live streaming platform is aware of any relationship the user of the streaming device has with one or more online casinos through which one or more users of client devices access the streamed content. For example, the live streaming platform stores data associated with a negotiated rate an online casino associated with a remote game server has with a user of a streaming device to provide content from the online casino. In another example, the live streaming platform stores data associated with a percentage of back bets placed by users of client devices at an online casino associated with a remote game server that should be allocated to an account associated with a user of a streaming device providing content from the online casino.

In certain embodiments in which the system accounts for certain arrangements between users of the system and operators of the system, upon an occurrence of a benefit realization event, such as after the user of the streaming device concludes a streaming session, the live streaming platform calculates the amount of funds owned by each respective online casino to the user of the streaming device. This information is made available to the user of the streaming device via one or more benefit reports they can access, such as via their live streaming platform account. In certain such embodiments, the live streaming platform further handles billing the respective online casinos for their respective portions of the benefit owed to the user of the streaming device (as well as for any platform fees, such as online or app store fees) and deposits the funds into one or more accounts of the user of the streaming device.

As such, in certain embodiments, the system receives, from a first client device associated with a first remote game server, data associated with an amount of a first wager placed on a play of a wagering game displayed by a streaming device associated with a second remote game server, and receives, from a second client device associated with a third remote game server, data associated with an amount of a second wager placed on the play of the wagering game displayed by the streaming device, wherein the first remote game server and the second remote game server are different remote game servers. In these embodiments, responsive to an occurrence of a benefit realization event, the system determines a first benefit attributable to the first client device, and communicates, to the first remote game server, data that results in the determined first benefit being made available to a user of the streaming device. In these embodiments, responsive to the occurrence of the benefit realization event, the system further determines a second benefit attributable to the second client device, and communicates, to the third remote game server, data that results in the determined second benefit being made available to the user of the streaming device.

In certain additional embodiments in which the employment of different remote game servers results in the system needing to intervene to account for such differences relates to how to handle certain monetary tips sent from certain viewers of client devices to the user of the streaming device. In such embodiments in which the streaming device and the client device are associated with different remote game servers, such tipping requires heightened coordination relative to instances when the streaming device and the client device are associated with the same remote game server (or not associated with any remote game servers). That is, support for such tipping from a user of a client device to a user of a streaming device is relatively difficult to implement given the current API set of various remote game servers and/or due to anti-money laundering concerns (e.g., reporting requirements and concerns about cross-jurisdictional fund transfers). In one such embodiment, the system of the present disclose accounts for these technical challenges by enabling users of client devices to directly gift or tip the user of the streaming device only if the client device is associated with the same operator and/or the same remote game server as the streaming device (e.g., the viewer is using the streamer's default operator so any fund transfer would be within that single operator). In this embodiment, for users of client devices not associated with the same operator and/or remote game server as the streaming device (e.g., for viewers who are viewing the live stream on an operator outside of the streamer's default operator), the live streaming platform only offers such users of client devices alternative mechanisms to transfer funds to the user of the streaming device, such as using a peer-to-peer type application, such as PayPal or Venmo.

As such, in certain embodiments, the system receives, from a client device associated with a first remote game server, data associated with an amount of a first wager placed on a play of a wagering game displayed by a streaming device associated with a second remote game server, and receives, from the client device, data associated with a request to tip a user of the streaming device. In these embodiments, responsive to the first remote game server and the second remote game server being the same remote game server, the system approves the request to tip the user of the streaming device. On the other hand, responsive to the first remote game server and the second remote game server being different remote game servers, the system denies the request to tip the user of the streaming device (and rather, in certain instances, offers alternative ways to tip the user of the streaming device).

In certain additional embodiments in which the employment of different remote game servers results in the system needing to intervene to account for such differences relates to how to handle certain gifts or awards sent from a user of a streaming device to certain viewers of client devices. In such embodiments in which the streaming device and the client device are associated with different remote game servers, such gifting requires heightened coordination relative to instances when the streaming device and the client device are associated with the same remote game server (or not associated with any remote game servers). That is, support for such gifting from a user of a streaming device to a user of a client device is relatively difficult to implement given the current API set of various remote game servers and/or due to anti-money laundering concerns (e.g., reporting requirements and concerns about cross-jurisdictional fund transfers). In one such embodiment, the system of the present disclose accounts for these technical challenges by enabling users of streaming devices to directly gift the user of the client device only if the client device is associated with the same operator and/or the same remote game server as the streaming device (e.g., the viewer is using the streamer's default operator so any fund transfer would be within that single operator). In this embodiment, for users of streaming devices not associated with the same operator and/or remote game server as the client device (e.g., for viewers who are viewing the live stream on an operator outside of the streamer's default operator), the live streaming platform only offers such users of streaming devices alternative mechanisms to transfer funds to the user of the client device, such as using a peer-to-peer type application, such as PayPal or Venmo.

As such, in certain embodiments, the system receives, from a client device associated with a first remote game server, data associated with an amount of a first wager placed on a play of a wagering game displayed by a streaming device associated with a second remote game server, and receives, from the streaming device, data associated with a request to gift a user of the client device. In these embodiments, responsive to the first remote game server and the second remote game server being the same remote game server, the system approves the request to gift the user of the client device. On the other hand, responsive to the first remote game server and the second remote game server being different remote game servers, the system denies the request to gift the user of the client device (and rather, in certain instances, offers alternative ways to gift the user of the client device).

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "streaming device" and/or "client device" as used herein refers to various configurations of: (a) one or more servers; (b) one or more electronic gaming machines; (c) one or more components of a gaming establishment management system associated with an electronic gaming machine, such as a slot machine interface board; (d) one or more devices associated with an electronic gaming machine, such as a slot machine interface board, operating independent of any components of a gaming establishment management system, and/or (e) one or more personal gaming devices (e.g., desktop computers, laptop computers, tablet computers or computing devices, personal digital assistants, mobile phones, and other mobile computing devices). Thus, in various embodiments, the streaming devices and client devices of the present disclosure include: (a) one or more electronic gaming machines in combination with one or more servers; (b) one or more slot machine interface boards (or other components of a gaming establishment management system or other components independent of a gaming establishment management system) in communication with one or more servers; (c) one or more personal gaming devices in combination with one or more servers; (d) one or more personal gaming devices in combination with one or more electronic gaming machines; (e) one or more personal gaming devices in combination with one or more slot machine interface boards (or other components of a gaming establishment management system or other components independent of a gaming establishment management system); (f) one or more personal gaming devices, one or more electronic gaming machines, one or more slot machine interface boards (or other components of a gaming establishment management system or other components independent of a gaming establishment management system) and one or more servers in combination with one another; (g) a single electronic gaming machine; (h) a plurality of electronic gaming machines in combination with one another; (i) a single personal gaming device; (j) a plurality of personal gaming devices in combination with one another; (k) as single slot machine interface board (or another component of a gaming establishment management system or another component independent of a gaming establishment management system); (l) a plurality of slot machine interface boards (or other components of a gaming establishment management system or other components independent of a gaming establishment management system) in combination with one another; (m) a single server; and/or (n) a plurality of servers in combination with one another. For brevity and clarity and unless specifically stated otherwise, "streaming device" as used herein represents one streaming device or a plurality of streaming devices, "client device" as used herein represents one client device or a plurality of client devices and "server" as used herein represents one server or a plurality of servers.

As noted above, in various embodiments, the system includes a streaming device and/or a client device in combination with a server. In such embodiments, the streaming device and/or client device is configured to communicate with the server through a data network or remote communication link. In certain such embodiments, the streaming device and/or client device is configured to communicate with another streaming device and/or client device through the same data network or remote communication link or through a different data network or remote communication link.

In certain embodiments in which the system includes a streaming device and/or a client device in combination with a server, the server is any suitable computing device (such as a server) that includes at least one processor and at least one memory device or data storage device. As further described herein, the streaming device and/or client device includes at least one streaming device and/or client device processor configured to transmit and receive data or signals representing events, messages, commands, or any other suitable information between the streaming device and/or client device and the server. The at least one processor of that streaming device and/or client device is configured to execute the events, messages, or commands represented by such data or signals in conjunction with the operation of the streaming device and/or client device. Moreover, the at least one processor of the server is configured to transmit and receive data or signals representing events, messages, commands, or any other suitable information between the server and the streaming device and/or client device. The at least one processor of the server is configured to execute the events, messages, or commands represented by such data or signals in conjunction with the operation of the server. One, more than one, or each of the functions of the server may be performed by the at least one processor of the streaming device and/or client device. Further, one, more than one, or each of the functions of the at least one processor of the streaming device and/or client device may be performed by the at least one processor of the server.

In certain such embodiments, computerized instructions for controlling any games (such as any primary or base games and/or any secondary or bonus games) displayed by the streaming device and/or client device are executed by the server. In such "thin client" embodiments, the server remotely controls any games (or other suitable interfaces) displayed by the streaming device and/or client device, and the streaming device and/or client device is utilized to display such games (or suitable interfaces) and to receive one or more inputs or commands. In other such embodiments, computerized instructions for controlling any games displayed by the streaming device and/or client device are communicated from the server to the streaming device and/or client device and are stored in at least one memory device of the streaming device and/or client device. In such "thick client" embodiments, the at least one processor of the streaming device and/or client device executes the computerized instructions to control any games (or other suitable interfaces) displayed by the streaming device and/or client device.

In various embodiments in which the system includes a plurality of streaming devices and/or client devices, one or more of the streaming devices and/or client devices are thin client streaming devices and/or client devices and one or more of the streaming devices and/or client devices are thick client streaming devices and/or client devices. In other embodiments in which the system includes one or more streaming devices and/or client devices, certain functions of one or more of the streaming devices and/or client devices are implemented in a thin client environment, and certain other functions of one or more of the streaming devices and/or client devices are implemented in a thick client environment. In one such embodiment in which the system includes a streaming device and/or a client device and a server, computerized instructions for controlling any primary or base games displayed by the streaming device and/or client device are communicated from the server to the streaming device and/or client device in a thick client configuration, and computerized instructions for controlling any secondary or bonus games or other functions displayed by the streaming device and/or client device are executed by the server in a thin client configuration.

In certain embodiments in which the system includes: (a) a streaming device and/or a client device configured to communicate with a server through a data network; and/or (b) a plurality of streaming devices and/or client devices configured to communicate with one another through a data network, the data network is a local area network (LAN) in which the streaming devices and/or client devices are located substantially proximate to one another and/or the server. In one example, the streaming devices and/or client devices and the server are located in a gaming establishment or a portion of a gaming establishment. In other embodiments in which the system includes: (a) a streaming device and/or a client device configured to communicate with a server through a data network; and/or (b) a plurality of streaming devices and/or client devices configured to communicate with one another through a data network, the data network is a wide area network (WAN) in which one or more of the streaming devices and/or client devices are not necessarily located substantially proximate to another one of the streaming devices and/or client devices and/or the server. For example, one or more of the streaming devices and/or client devices are located: (a) in an area of a gaming establishment different from an area of the gaming establishment in which the server is located; or (b) in a gaming establishment different from the gaming establishment in which the server is located. In another example, the server is not located within a gaming establishment in which the streaming devices and/or client devices are located. In certain embodiments in which the data network is a WAN, the system includes a server and a streaming device and/or a client device each located in a different gaming establishment in a same geographic area, such as a same city or a same state. Systems in which the data network is a WAN are substantially identical to systems in which the data network is a LAN, though the quantity of streaming devices and/or client devices in such systems may vary relative to one another.

In further embodiments in which the system includes: (a) a streaming device and/or a client device configured to communicate with a server through a data network; and/or (b) a plurality of streaming devices and/or client devices configured to communicate with one another through a data network, the data network is an internet or an intranet. In certain such embodiments, an internet browser of the streaming device and/or client device is usable to access an internet game page from any location where an internet connection is available. In one such embodiment, after the streaming device and/or client device accesses the internet game page, the server identifies a user before enabling that user to place any wagers on any plays of any wagering games. In one example, the server identifies the user by requiring a user account of the user to be logged into via an input of a unique username and password combination assigned to the user. The server may, however, identify the user in any other suitable manner, such as by validating a player tracking identification number associated with the user; by reading a player tracking card or other smart card inserted into a card reader (as described below); by validating a unique user identification number associated with the user by the server; or by identifying the streaming device and/or client device, such as by identifying the MAC address or the IP address of the internet facilitator. In various embodiments, once the server identifies the user, the server enables placement of one or more wagers on one or more plays of one or more primary or base games and/or one or more secondary or bonus games, and displays those plays via the internet browser of the streaming device and/or client device.

The server and the streaming device and/or client device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium.

Figure 8A:
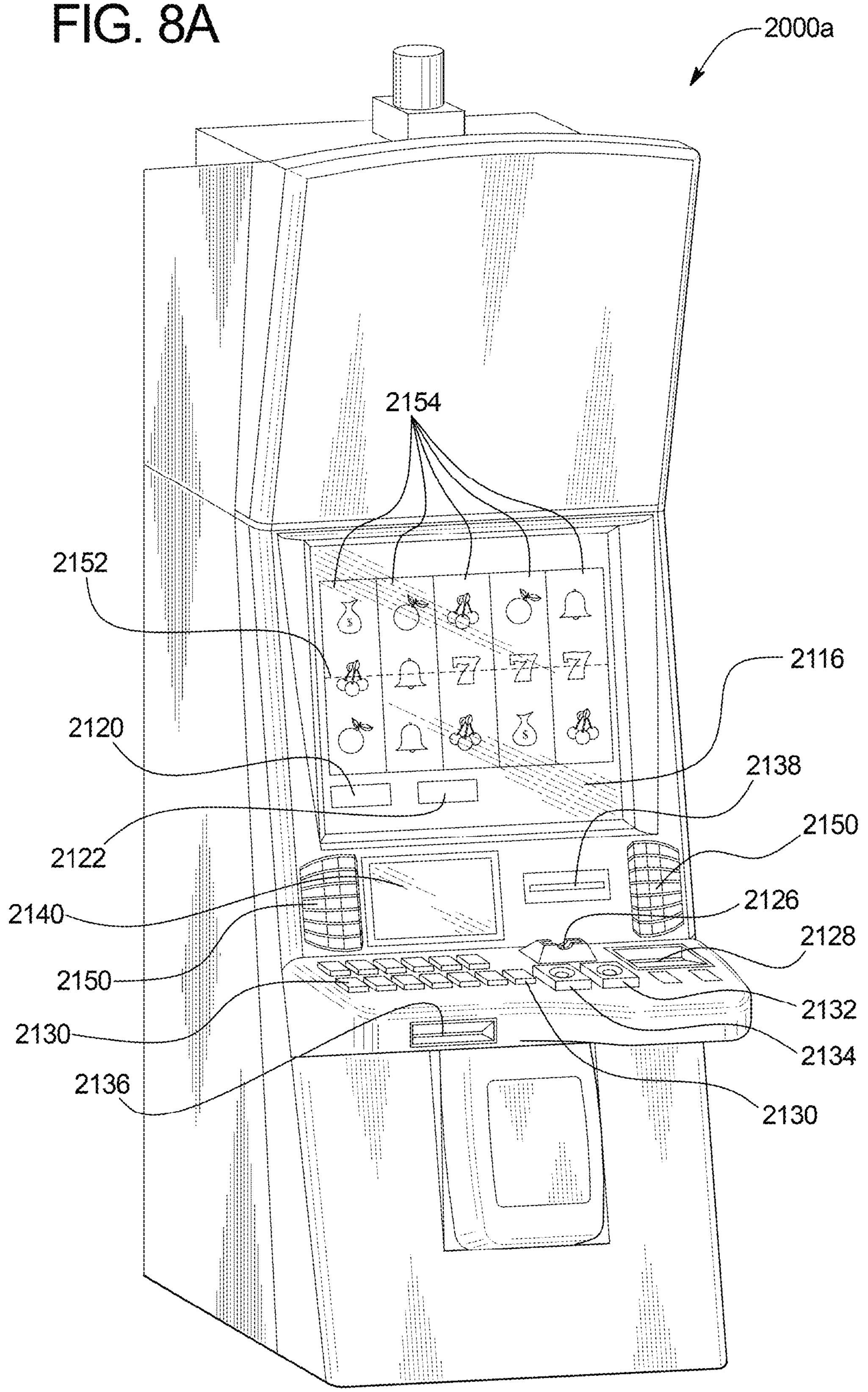
FIGS. 8A and 8B are perspective views of example alternative embodiments of an electronic gaming machine of the present disclosure.
Figure 8B:
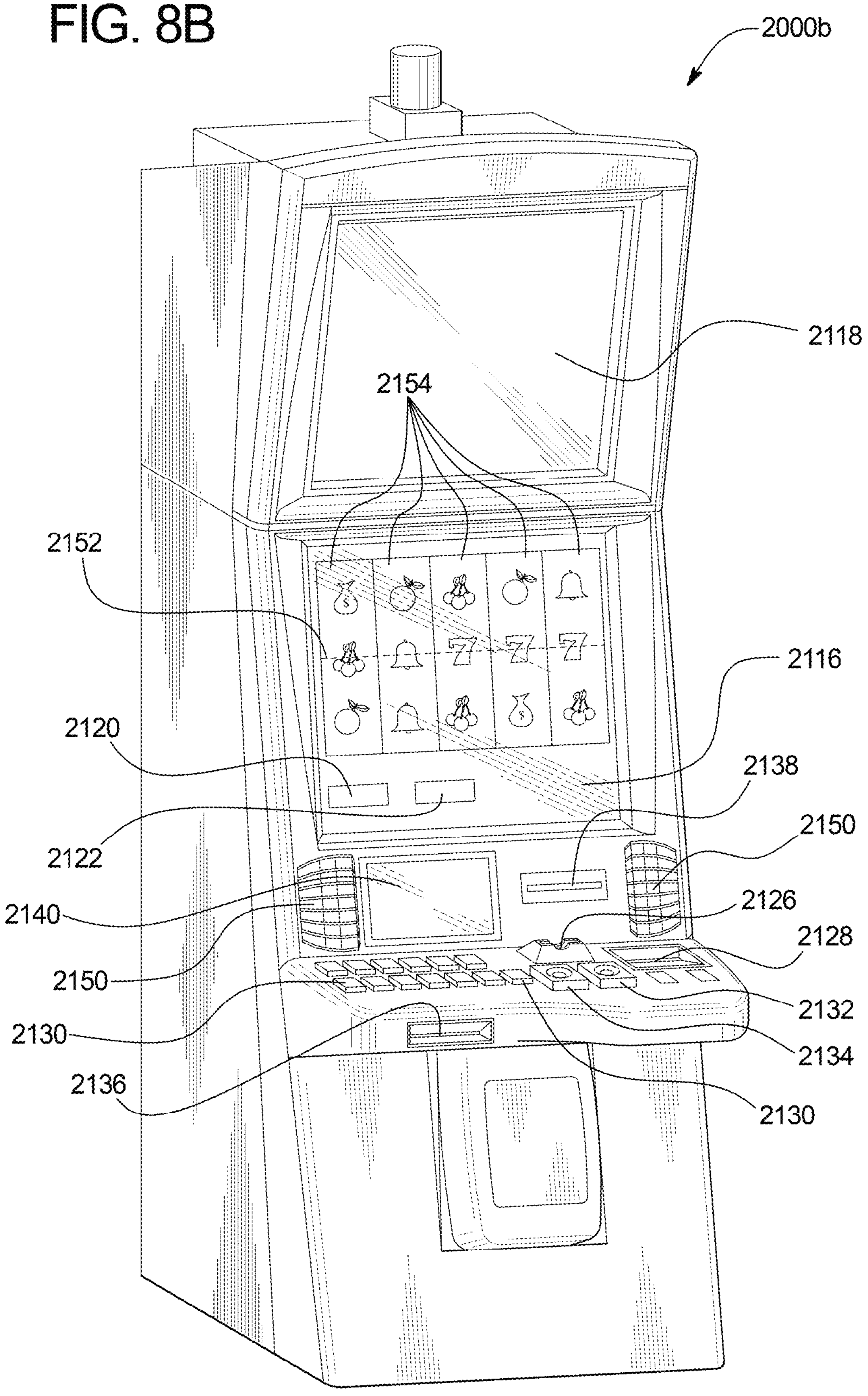
Figure 8C:
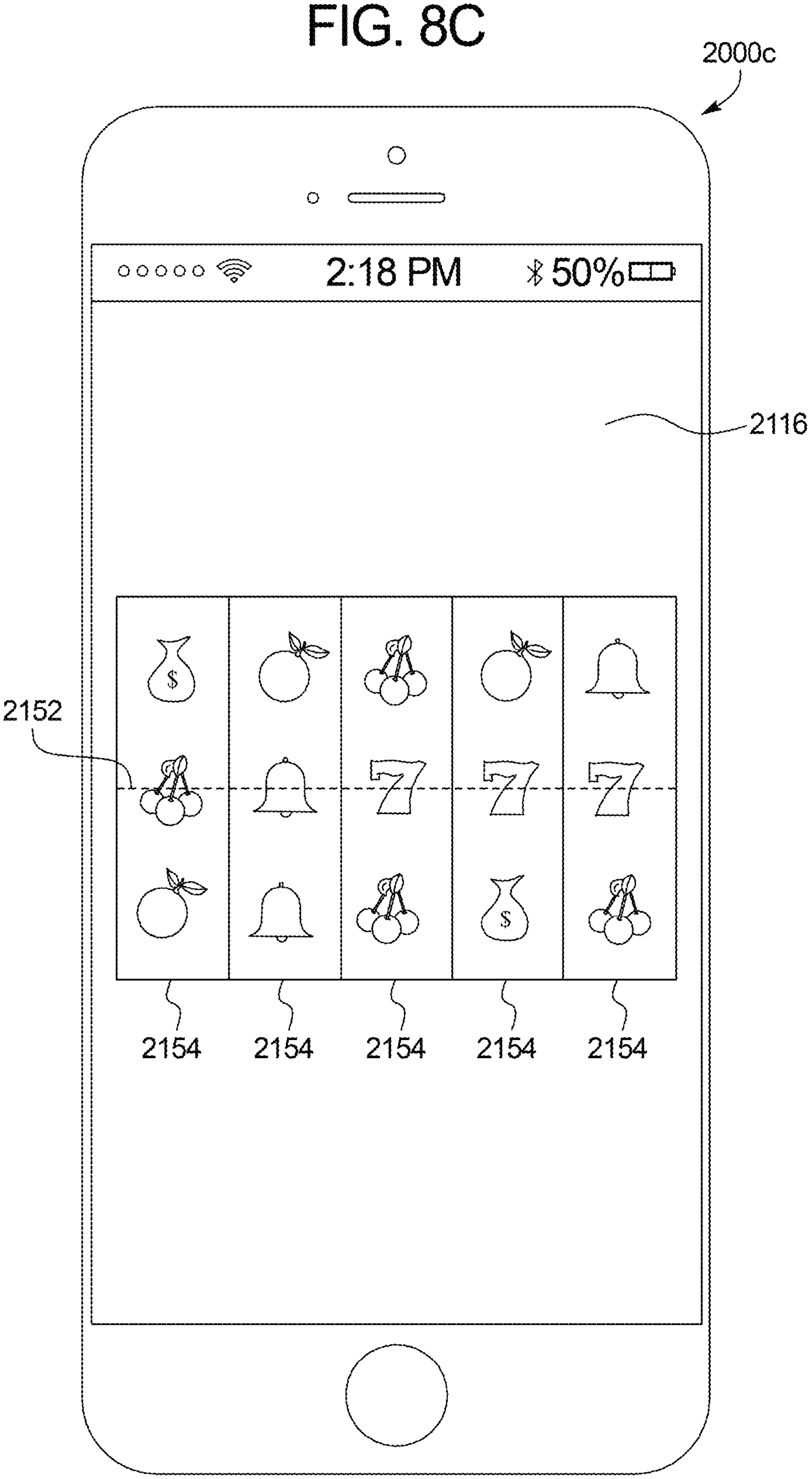
FIG. 8C is a front view of an example personal gaming device of the present disclosure.

FIG. 7 is a block diagram of an example streaming device and/or client device 1000 and FIGS. 8A and 8B include two different example streaming devices and/or client devices 2000*a* and 2000*b*. The streaming devices and/or client devices 1000, 2000*a*, and 2000*b* are merely example streaming devices and/or client devices, and different streaming devices and/or client devices may be implemented using different combinations of the components shown in the streaming devices and/or the client devices 1000, 2000*a*, and 2000*b*. Although the below refers to streaming devices and/or client devices, in various embodiments personal gaming devices (such as personal gaming device 2000*c* of FIG. 8C) may include some or all of the below components.

In these embodiments, the streaming device and/or the client device 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the streaming device and/or the client device; (3) accessing memory to configure or reconfigure game parameters in the memory according to indicia read from the streaming device and/or the client device; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the streaming device and/or the client device (described below), while in other embodiments at least one component of the master gaming controller 1012 resides outside of the housing of the streaming device and/or the client device.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the streaming device and/or the client device of the present disclosure. In certain embodiments, the at least one memory device 1016 resides within the housing of the streaming device and/or the client device (described below), while in other embodiments at least one component of the at least one memory device 1016 resides outside of the housing of the streaming device and/or the client device.

The at least one memory device 1016 is configured to store, for example: (1) configuration software 1014, such as all the parameters and settings for a game playable on the streaming device and/or the client device; (2) associations 1018 between configuration indicia read from a streaming device and/or a client device with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the streaming device and/or the client device to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the streaming device and/or the client device to control the streaming device and/or the client device. The at least one memory device 1016 of the streaming device and/or the client device also stores other operating data, such as image data, event data, input data, random number generators (RNGs) or pseudo-RNGs, paytable data or information, and/or applicable game rules that relate to the play of one or more games on the streaming device and/or the client device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a streaming device and/or a client device to implement at least part of the present disclosure. In other embodiments, part or all of the program code and/or the operating data is downloaded to the at least one memory device of the streaming device and/or the client device through any suitable data network described above (such as an internet or intranet).

The at least one memory device 1016 also stores a plurality of device drivers 1042. Examples of different types of device drivers include device drivers for streaming device and/or client device components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the streaming device and/or the client device. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the streaming device and/or the client device loads the new device driver from the at least one memory device to enable communication with the new device. For instance, one type of card reader in the streaming device and/or the client device can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified streaming device and/or client device components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one user/device tracking module 1078; and (14) at least one information filtering module 1079.

The at least one output device 1020 includes at least one display device 1035 configured to display any game(s) displayed by the streaming device and/or the client device and any suitable information associated with such game(s). In certain embodiments, the display devices are connected to or mounted on a housing of the streaming device and/or the client device (described below). In various embodiments, the display devices serve as digital glass configured to advertise certain games or other aspects of the gaming establishment in which the streaming device and/or the client device is located. In various embodiments, the streaming device and/or the client device includes one or more of the following display devices: (a) a central display device; (b) a player tracking display configured to display various information regarding a user's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example streaming device and/or client device 2000*a* illustrated in FIG. 8A includes a central display device 2116, a player tracking display 2140, a credit display 2120, and a bet display 2122. The example streaming device and/or client device 2000*b* illustrated in FIG. 8B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the streaming device and/or the client device are configured to display one or more game and/or non-game images, symbols, and indicia. In certain embodiments, the display devices of the streaming device and/or the client device are configured to display any suitable visual representation or exhibition of the movement of objects; dynamic lighting; video images; images of people, characters, places, things, and faces of cards; and the like. In certain embodiments, the display devices of the streaming device and/or the client device are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the streaming device and/or the client device receives an actuation of a cashout device (described below), the streaming device and/or the client device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example streaming devices and/or client devices 2000*a* and 2000*b* illustrated in FIGS. 8A and 8B each include a ticket printer and dispenser 2136.

In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user. While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the streaming device and/or the client device, such as an attract mode. The example streaming devices and/or client devices 2000*a* and 2000*b* illustrated in FIGS. 8A and 8B each include a plurality of speakers 2150. In another such embodiment, the streaming device and/or the client device provides dynamic sounds coupled with attractive multimedia images displayed on one or more of the display devices to provide an audio-visual representation or to otherwise display full-motion video with sound to attract users to the streaming device and/or the client device. In certain embodiments, the streaming device and/or the client device displays a sequence of audio and/or visual attraction messages during idle periods to attract potential users to the streaming device and/or the client device. The videos may be customized to provide any appropriate information.

The at least one input device 1030 may include any suitable device that enables an input signal to be produced and received by the at least one processor 1010 of the streaming device and/or the client device.

In one embodiment, the at least one input device 1030 includes a payment device configured to communicate with the at least one processor of the streaming device and/or the client device to fund the streaming device and/or the client device. In certain embodiments, the payment device includes one or more of: (a) a bill acceptor into which paper money is inserted to fund the streaming device and/or the client device; (b) a ticket acceptor into which a ticket or a voucher is inserted to fund the streaming device and/or the client device; (c) a coin slot into which coins or tokens are inserted to fund the streaming device and/or the client device; (d) a reader or a validator for credit cards, debit cards, or credit slips into which a credit card, debit card, or credit slip is inserted to fund the streaming device and/or the client device; (e) a user identification card reader into which a user identification card is inserted to fund the streaming device and/or the client device; or (f) any suitable combination thereof. The example streaming devices and/or client devices 2000*a* and 2000*b* illustrated in FIGS. 8A and 8B each include a combined bill and ticket acceptor 2128 and a coin slot 2126.

In one embodiment, the at least one input device 1030 includes a payment device configured to enable the streaming device and/or the client device to be funded via an electronic funds transfer, such as a transfer of funds from a bank account. In another embodiment, the streaming device and/or the client device includes a payment device configured to communicate with a mobile device of a user, such as a mobile phone, a radio frequency identification tag, or any other suitable wired or wireless device, to retrieve relevant information associated with that user to fund the streaming device and/or the client device. When the streaming device and/or the client device is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). One such wagering or betting device is as a maximum wager or bet device that, when actuated, causes the streaming device and/or the client device to place a maximum wager on a play of a game. Another such wagering or betting device is a repeat bet device that, when actuated, causes the streaming device and/or the client device to place a wager that is equal to the previously-placed wager on a play of a game. A further such wagering or betting device is a bet one device that, when actuated, causes the streaming device and/or the client device to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). After a user appropriately funds the streaming device and/or the client device and places a wager, the streaming device and/or the client device activates the game play activation device to enable the user to actuate the game play activation device to initiate a play of a game on the streaming device and/or the client device (or another suitable sequence of events associated with the streaming device and/or the client device). After the streaming device and/or the client device receives an actuation of the game play activation device, the streaming device and/or the client device initiates the play of the game. The example streaming devices and/or client devices 2000*a* and 2000*b* illustrated in FIGS. 8A and 8B each include a game play activation device in the form of a game play initiation button 2132. In other embodiments, the streaming device and/or the client device begins game play automatically upon appropriate funding rather than upon utilization of the game play activation device.

In other embodiments, the at least one input device 1030 includes a cashout device. In various embodiments, the cashout device is: (1) a mechanical button supported by the housing of the streaming device and/or the client device (such as a hard key or a programmable soft key), or (2) an icon displayed on a display device of the streaming device and/or the client device (described below) that is actuatable via a touch screen of the streaming device and/or the client device (described below) or via use of a suitable input device of the streaming device and/or the client device (such as a mouse or a joystick). When the streaming device and/or the client device receives an actuation of the cashout device from a user and the user has a positive (i.e., greater-than-zero) credit balance, the streaming device and/or the client device initiates a payout associated with the user's credit balance. The example streaming devices and/or client devices 2000*a* and 2000*b* illustrated in FIGS. 8A and 8B each include a cashout device in the form of a cashout button 2134.

In various embodiments, the at least one input device 1030 includes a plurality of buttons that are programmable by the streaming device and/or the client device operator to, when actuated, cause the streaming device and/or the client device to perform particular functions. For instance, such buttons may be hard keys, programmable soft keys, or icons icon displayed on a display device of the streaming device and/or the client device (described below) that are actuatable via a touch screen of the streaming device and/or the client device (described below) or via use of a suitable input device of the streaming device and/or the client device (such as a mouse or a joystick). The example streaming devices and/or client devices 2000*a* and 2000*b* illustrated in FIGS. 8A and 8B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the streaming device and/or the client device by touching the touch screen at the appropriate locations.

In embodiments including a player tracking system, as further described below, the at least one input device 1030 includes a card reader in communication with the at least one processor of the streaming device and/or the client device. The example streaming devices and/or client devices 2000*a* and 2000*b* illustrated in FIGS. 8A and 8B each include a card reader 2138. The card reader is configured to read a user identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the streaming device and/or the client device. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the streaming device and/or the client device, such as one or more rechargeable power sources (e.g., rechargeable batteries) located at the streaming device and/or the client device.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the streaming device and/or the client device; detecting the presence and/or identity of various persons (e.g., users, casino employees, etc.), devices (e.g., user input devices), and/or systems within a predetermined proximity to the streaming device and/or the client device.

The at least one data preservation component 1062 is configured to detect or sense one or more events and/or conditions that, for example, may result in damage to the streaming device and/or the client device and/or that may result in loss of information associated with the streaming device and/or the client device. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected user movements and/or gestures to determine appropriate user input information relating to the detected user movements and/or gestures. For example, in one embodiment, the at least one motion/gesture analysis and interpretation component 1064 is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source 1068 enables the streaming device and/or the client device to operate in a mobile environment. For example, in one embodiment, the streaming device and/or the client device includes one or more rechargeable batteries.

The at least one geolocation module 1076 is configured to acquire geolocation information from one or more remote sources and use the acquired geolocation information to determine information relating to a relative and/or absolute position of the streaming device and/or the client device. For example, in one implementation, the at least one geolocation module 1076 is configured to receive GPS signal information for use in determining the position or location of the streaming device and/or the client device. In another implementation, the at least one geolocation module 1076 is configured to receive multiple wireless signals from multiple remote devices (e.g., streaming devices and/or client devices, servers, wireless access points, etc.) and use the signal information to compute position/location information relating to the position or location of the streaming device and/or the client device.

The at least one user identification module 1077 is configured to determine the identity of the current user or current owner of the streaming device and/or the client device. For example, in one embodiment, the current user is required to perform a login process at the streaming device and/or the client device in order to access one or more features. Alternatively, the streaming device and/or the client device is configured to automatically determine the identity of the current user based on one or more external signals, such as an RFID tag or badge worn by the current user and that provides a wireless signal to the streaming device and/or the client device that is used to determine the identity of the current user. In at least one embodiment, various security features are incorporated into the streaming device and/or the client device to prevent unauthorized users from accessing confidential or sensitive information.

The at least one information filtering module 1079 is configured to perform filtering (e.g., based on specified criteria) of selected information to be displayed at one or more displays 1035 of the streaming device and/or the client device.

In various embodiments, the streaming device and/or the client device includes a plurality of communication ports configured to enable the at least one processor of the streaming device and/or the client device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example streaming devices and/or client devices 2000*a* and 2000*b* illustrated in FIGS. 8A and 8B, the streaming device and/or the client device has a support structure, housing, or cabinet that provides support for a plurality of the input devices and the output devices of the streaming device and/or the client device. Further, the streaming device and/or the client device is configured such that a user may operate it while standing or sitting. In various embodiments, the streaming device and/or the client device is positioned on a base or stand, or is configured as a pub-style tabletop game (not shown) that a user may operate typically while sitting. As illustrated by the different example streaming devices and/or client devices 2000*a* and 2000*b* shown in FIGS. 8A and 8B, streaming devices and/or client devices may have varying housing and display configurations.

In certain embodiments, the streaming device and/or the client device is a device that has obtained approval from a regulatory gaming commission, and in other embodiments, the streaming device and/or the client device is a device that has not obtained approval from a regulatory gaming commission.

The streaming devices and/or client devices described above are merely three examples of different types of streaming devices and/or client devices. Certain of these example streaming devices and/or client devices may include one or more elements that may not be included in all systems, and these example streaming devices and/or client devices may not include one or more elements that are included in other systems. For example, certain streaming devices and/or client devices include a coin acceptor while others do not.

In various embodiments, a streaming device and/or a client device may be implemented in one of a variety of different configurations. In various embodiments, the streaming device and/or the client device may be implemented as one of: (a) a dedicated streaming device and/or client device in which computerized game programs executable by the streaming device and/or the client device for controlling any primary or base games (referred to herein as "primary games") and/or any secondary or bonus games or other functions (referred to herein as "secondary games") displayed by the streaming device and/or the client device are provided with the streaming device and/or the client device before delivery to a gaming establishment or before being provided to a user; and (b) a changeable streaming device and/or client device in which computerized game programs executable by the streaming device and/or the client device for controlling any primary games and/or secondary games displayed by the streaming device and/or the client device are downloadable or otherwise transferred to the streaming device and/or the client device through a data network or remote communication link; from a USB drive, flash memory card, or other suitable memory device; or in any other suitable manner after the streaming device and/or the client device is physically located in a gaming establishment or after the streaming device and/or the client device is provided to a user.

As generally explained above, in various embodiments in which the system includes a server and a changeable streaming device and/or client device, the at least one memory device of the server stores different game programs and instructions executable by the at least one processor of the changeable streaming device and/or client device to control one or more primary games and/or secondary games displayed by the changeable streaming device and/or client device. More specifically, each such executable game program represents a different game or a different type of game that the at least one changeable streaming device and/or client device is configured to operate. In one example, certain of the game programs are executable by the changeable streaming device and/or client device to operate games having the same or substantially the same game play but different paytables. In different embodiments, each executable game program is associated with a primary game, a secondary game, or both. In certain embodiments, an executable game program is executable by the at least one processor of the at least one changeable streaming device and/or client device as a secondary game to be played simultaneously with a play of a primary game (which may be downloaded to or otherwise stored on the at least one changeable streaming device and/or client device), or vice versa.

In operation of such embodiments, the server is configured to communicate one or more of the stored executable game programs to the at least one processor of the changeable streaming device and/or client device. In different embodiments, a stored executable game program is communicated or delivered to the at least one processor of the changeable streaming device and/or client device by: (a) embedding the executable game program in a device or a component (such as a microchip to be inserted into the changeable streaming device and/or client device); (b) writing the executable game program onto a disc or other media; or (c) uploading or streaming the executable game program over a data network (such as a dedicated data network). After the executable game program is communicated from the server to the changeable streaming device and/or client device, the at least one processor of the changeable streaming device and/or client device executes the executable game program to enable the primary game and/or the secondary game associated with that executable game program to be played using the display device(s) and/or the input device(s) of the changeable streaming device and/or client device. That is, when an executable game program is communicated to the at least one processor of the changeable streaming device and/or client device, the at least one processor of the changeable streaming device and/or client device changes the game or the type of game that may be played using the changeable streaming device and/or client device.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the system includes a server and a streaming device and/or a client device, the streaming device and/or the client device is configured to communicate with the server for monitoring purposes only. In such embodiments, the streaming device and/or the client device determines the game outcome(s) and/or award(s) to be provided in any of the manners described above, and the server monitors the activities and events occurring on the streaming device and/or the client device. In one such embodiment, the system includes a real-time or online accounting and gaming information system configured to communicate with the server. In this embodiment, the accounting and gaming information system includes: (a) a user database configured to store user profiles, (b) a player tracking module configured to track users (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example streaming device and/or client device **2000*b* shown in FIG. 8B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement. In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of user excitement than the primary game(s) because the secondary game (s) provides a greater expectation of winning than the primary game(s) and is accompanied with more attractive or unusual features than the primary game(s). The secondary game(s) may be any type of suitable game, either similar to or completely different from the primary game. In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game. In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game. In certain embodiments, no separate entry fee or buy-in for the secondary game is required. That is, entry into the secondary game cannot be purchased; rather, in these embodiments, entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of streaming devices and/or client devices, the streaming devices and/or the client devices are configured to communicate with one another to provide a group gaming environment. In certain such embodiments, the streaming devices and/or the client devices enable users of those streaming devices and/or client devices to work in conjunction with one another, such as by enabling the users to play together as a team or group, to win one or more awards. In other such embodiments, the streaming devices and/or the client devices enable users of those streaming devices and/or client devices to compete against one another for one or more awards. In one such embodiment, the streaming devices and/or the client devices enable the users of those streaming devices and/or client devices to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a user's gaming activity. In one such embodiment, the player tracking system does so through the use of player tracking cards. In this embodiment, a user is issued a user identification card that has an encoded user identification number that uniquely identifies the user. When the user's playing tracking card is inserted into a card reader of the system to begin a gaming session, the card reader reads the user identification number off the player tracking card to identify the user. The system timely tracks any suitable information or data relating to the identified user's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more users, the player tracking system includes the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device—such as a smartphone, a tablet computer, a desktop computer, or a laptop computer—to enable web-based game play using the personal gaming device. In various embodiments, the user must first access a gaming website via an internet browser of the personal gaming device or execute an application (commonly called an "app") installed on the personal gaming device before the user can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the user before enabling game play on the personal gaming device (or, in some embodiments, before enabling monetary wager-based game play on the personal gaming device). In these embodiments, the user must identify herself to the one or more servers, such as by inputting the user's unique username and password combination (or in any other manners described above.

Once identified, the one or more servers enable the user to establish an account balance from which the user can draw credits usable to wager on plays of a game. In certain embodiments, the one or more servers enable the user to initiate an electronic funds transfer to transfer funds from a bank account to the user's account balance. In other embodiments, the one or more servers enable the user to make a payment using the user's credit card, debit card, or other suitable device to add money to the user's account balance. In other embodiments, the one or more servers enable the user to add money to the user's account balance via a peer-to-peer type application, such as PayPal or Venmo. The one or more servers also enable the user to cash out the user's account balance (or part of it) in any suitable manner, such as via an electronic funds transfer or by initiating creation of a paper check that is mailed to the user.

In certain embodiments, the one or more servers include a payment server that handles establishing and cashing out users'account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the user's account balance can cover the desired wager (i.e., includes a monetary balance at least equal to the desired wager).

If the payment server determines that the user's account balance cannot cover the desired wager, the payment server notifies the game server, which then instructs the personal gaming device to display a suitable notification to the user that the user's account balance is too low to place the desired wager. If the payment server determines that the user's account balance can cover the desired wager, the payment server deducts the desired wager from the account balance and notifies the game server. The game server then determines an outcome and any associated award for the play of the game. The game server notifies the payment server of any nonzero award, and the payment server increases the user's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes a streaming device and/or a client device configured to communicate with a personal gaming device—such as a smartphone, a tablet computer, a desktop computer, or a laptop computer—to enable tethered mobile game play using the personal gaming device. Generally, in these embodiments, the streaming device and/or the client device establishes communication with the personal gaming device and enables the user to play games on the streaming device and/or the client device remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the internet) to integrate a user's gaming experience with the user's social networking account. This enables the system to send certain information to the social network server that the social network server can use to create content (such as text, an image, and/or a video) and post it to the user's wall, newsfeed, or similar area of the social networking website accessible by the user's connections (and in certain cases the public) such that the user's connections can view that information. This also enables the system to receive certain information from the social network server, such as the user's likes or dislikes or the user's list of connections. In certain embodiments, the system enables the user to link the user's user account to the user's social networking account(s). This enables the system to, once it identifies the user and initiates a gaming session (such as via the user logging in to a website (or an application) on the user's personal gaming device or via the user inserting the user's player tracking card into a streaming device and/or a client device), link that gaming session to the user's social networking account(s). In other embodiments, the system enables the user to link the user's social networking account(s) to individual gaming sessions when desired by providing the required login information.

For instance, in one embodiment, if a user wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the user's wall (or other suitable area) of the social networking website for the user's connections to see (and to entice them to play). In another embodiment, if a user joins a multiuser game and there is another seat available, the system sends that information to the social network sever to enable the server to create associated content (such as text indicating a vacancy for that particular game) and to post that content to the user's wall (or other suitable area) of the social networking website for the user's connections to see (and to entice them to fill the vacancy). In another embodiment, if the user consents, the system sends advertisement information or offer information to the social network server to enable the social network server to create associated content (such as text or an image reflecting an advertisement and/or an offer) and to post that content to the user's wall (or other suitable area) of the social networking website for the user's connections to see. In another embodiment, the system enables the user to recommend a game to the user's connections by posting a recommendation to the user's wall (or other suitable area) of the social networking website.

Certain of the devices or components of the present disclosure, such as streaming devices and/or client devices located in a casino or another gaming establishment, include certain components and/or are configured to operate in certain manners that differentiate these systems from general purpose computing devices.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general-purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general-purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general-purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the user, the EGM stores the pre-power failure state in a non-volatile memory, returns to that state upon restoration of power, and provides the award to the user. This requirement affects the software and hardware design on EGMs. General purpose computing devices are not state-based machines, and a majority of data is usually lost when a malfunction occurs on a general-purpose computing device.

A second difference between EGMs and general-purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a user of an EGM from manipulating the EGM's hardware and software in a manner that gives him an unfair, and in some cases illegal, advantage.

A third difference between EGMs and general-purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general-purpose computing devices is that EGMs have unique peripheral device requirements that differ from those of a general-purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general-purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the user's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a user is required to make a number of selections on a video display screen. When a malfunction has occurred after the user has made one or more selections, the EGM may be restored to a state that shows the graphical presentation just before the malfunction including an indication of selections that have already been made by the user. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a user may decide that in a previous game of chance that they did not receive credit for an award that they believed they won. The game history information may be used to reconstruct the state of the EGM before, during, and/or after the disputed game to demonstrate whether the user was correct or not in the user's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third-party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general-purpose computing device typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A live streaming platform server comprising:

a processor; and a memory device that stores a plurality of instructions that, when executed by the processor, cause the processor to: responsive to a receipt, from a first remote game server operating with a streaming device, of first data determined by the first remote game server in association with a play of a wagering game displayed by the streaming device: automatically determine whether the first data determined by the first remote game server is authentic first data, responsive to the automatic determination being that the first data is authentic first data, communicate the authentic first data to a second, different remote game server operating with a client device, and responsive to the automatic determination being that the first data is not authentic first data, store the first data as unauthentic first data without communicating any data to the second, different remote game server operating with the client device.

2. The live streaming platform server of claim 1, wherein the automatic determination of whether the first data determined by the first remote game server is authentic first data is based on a validation of a security token.

3. The live streaming platform server of claim 2, wherein the security token is generated by a remote gaming platform operating with the second, different remote game server.

4. The live streaming platform server of claim 1, wherein the automatic determination of whether the first data determined by the first remote game server is authentic first data is based on a validation of a signature generated by the first remote game server.

5. The live streaming platform server of claim 1, wherein the automatic determination of whether the first data determined by the first remote game server is authentic first data is based on whether the first data has expired.

6. The live streaming platform server of claim 1, wherein the memory device stores a plurality of further instructions that, when executed by the processor responsive to the automatic determination being that the first data is authentic first data and responsive to a receipt, from the second, different remote game server operating with the client device, of second data determined by the second, different remote game server, cause the processor to communicate the second data to the client device.

7. The live streaming platform server of claim 6, wherein the communication of the second data to the client device results in a display, by a display device of the client device, of the play of the wagering game.

8. The live streaming platform server of claim 6, wherein the first data comprises a game outcome of the play of the wagering game determined by the first remote game server and the second data comprises a replication of the game outcome of the play of the wagering game determined by the second, different remote game server.

9. The live streaming platform server of claim 1, wherein the first remote game server and the second, different remote game server are associated with a single jurisdiction.

10. A remote game server comprising:

a processor; and a memory device that stores a plurality of instructions that, when executed by the processor, cause the processor to: receive, from another remote game server operating with a streaming device and independent of a live streaming platform server associated with the streaming device, first data associated with a play of a wagering game displayed by the streaming device, automatically determine whether the received first data is authentic data, responsive to the automatic determination being that the received first data is authentic first data: determine, based on the authentic first data, second data, and communicate the determined second data to a client device associated with the live streaming platform server, the client device displaying a stream of the play of the wagering game displayed by the streaming device, and responsive to the automatic determination being that the received first data is not authentic first data, communicate the first data to the live streaming platform server without communicating the first data to the client device.

11. The remote game server of claim 10, wherein the automatic determination of whether the first data is authentic first data is based on at least one of a validation of a security token, a validation of a signature generated by the other remote game server, and a determination of whether the first data has expired.

12. A method of operating a live streaming platform server, the method comprising: responsive to a receipt, from a first remote game server operating with a streaming device, of first data determined by the first remote game server in association with a play of a wagering game displayed by the streaming device: automatically determining, by a processor, whether the first data determined by the first remote game server is authentic first data, responsive to the automatic determination being that the first data is authentic first data, causing a communication, by the processor, of the authentic first data to a second, different remote game server operating with a client device, and responsive to the automatic determination being that the first data is not authentic first data, storing, by the processor, the first data as unauthentic first data without communicating any data to the second, different remote game server operating with the client device.

13. The method of claim 12, wherein the automatic determination of whether the first data determined by the first remote game server is authentic first data is based on a validation of a security token.

14. The method of claim 13, wherein the security token is generated by a remote gaming platform operating with the second, different remote game server.

15. The method of claim 12, wherein the automatic determination of whether the first data determined by the first remote game server is authentic first data is based on a validation of a signature generated by the first remote game server.

16. The method of claim 12, wherein the automatic determination of whether the first data determined by the first remote game server is authentic first data is based on whether the first data has expired.

17. The method of claim 12, further comprising, responsive to the automatic determination being that the first data is authentic first data and responsive to a receipt, from the second, different remote game server operating with the client device, of second data determined by the second, different remote game server, causing, by the processor, a communication of the second data to the client device.

18. The method of claim 17, wherein the communication of the second data to the client device results in a display, by a display device of the client device, of the play of the wagering game.

19. The method of claim 17, wherein the first data comprises a game outcome of the play of the wagering game determined by the first remote game server and the second data comprises a replication of the game outcome of the play of the wagering game determined by the second, different remote game server.

20. The method of claim 12, wherein the first remote game server and the second, different remote game server are associated with a single jurisdiction.

* * * * *